(12) United States Patent
Singer et al.

(10) Patent No.: US 8,230,084 B2
(45) Date of Patent: Jul. 24, 2012

(54) NETWORK MANAGEMENT IN A MEDIA NETWORK ENVIRONMENT

(75) Inventors: Mitch Fredrick Singer, Los Angeles, CA (US); Brian David Lakamp, Malibu, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1756 days.

(21) Appl. No.: 10/686,954

(22) Filed: Oct. 15, 2003

(65) Prior Publication Data

US 2004/0117484 A1    Jun. 17, 2004

Related U.S. Application Data

(60) Provisional application No. 60/434,774, filed on Dec. 17, 2002, provisional application No. 60/471,823, filed on May 20, 2003.

(51) Int. Cl.
    *G06F 15/16* (2006.01)
(52) U.S. Cl. ........................................ 709/229
(58) Field of Classification Search ........... 709/229
    See application file for complete search history.

(56) References Cited

U.S. PATENT DOCUMENTS

| | | | |
|---|---|---|---|
| 5,805,699 A | 9/1998 | Akiyama et al. | |
| 5,892,900 A | 4/1999 | Ginter et al. | |
| 5,915,018 A | 6/1999 | Aucsmith | |
| 5,918,016 A | 6/1999 | Brewer et al. | |
| 6,052,780 A | 4/2000 | Glover | |
| 6,104,677 A | 8/2000 | Kirihara et al. | |
| 6,185,686 B1 | 2/2001 | Glover | |
| 6,295,360 B1 | 9/2001 | Ryan et al. | |
| 6,310,956 B1 | 10/2001 | Morito et al. | |
| 6,438,692 B2 | 8/2002 | Kato et al. | |
| 6,463,534 B1 * | 10/2002 | Geiger et al. | 713/168 |
| 6,530,021 B1 | 3/2003 | Epstein et al. | |
| 6,550,011 B1 | 4/2003 | Sims, III | |
| 6,665,303 B1 | 12/2003 | Saito et al. | |
| 6,802,003 B1 | 10/2004 | Gross et al. | |
| 6,986,048 B1 | 1/2006 | Epstein et al. | |
| 7,024,466 B2 | 4/2006 | Outten et al. | |
| 7,039,801 B2 | 5/2006 | Narin | |
| 7,058,414 B1 | 6/2006 | Rofheart et al. | |
| 7,073,063 B2 | 7/2006 | Peinado | |

(Continued)

FOREIGN PATENT DOCUMENTS

JP    H11-194987 A    7/1999

(Continued)

OTHER PUBLICATIONS

Office Action issued in U.S. Appl. No. 11/120,674 on Sep. 9, 2008.

(Continued)

*Primary Examiner* — William Goodchild
(74) *Attorney, Agent, or Firm* — Samuel S. Lee; Procopio, Cory, Hargreaves & Savitch LLP

(57) ABSTRACT

Methods and apparatus for managing devices and content in a network environment. In one implementation, a method of adding a client as a member of a hub network includes: detecting a client connected to a server in a hub network; authenticating said client; authorizing said client; and adding said client as a member in said hub network.

24 Claims, 32 Drawing Sheets

U.S. PATENT DOCUMENTS

| | | | |
|---|---|---|---|
| 7,203,966 B2* | 4/2007 | Abburi et al. | 726/29 |
| 7,346,687 B2 | 3/2008 | Lipscomb et al. | |
| 7,376,840 B2* | 5/2008 | McCann et al. | 713/185 |
| 7,421,411 B2 | 9/2008 | Kontio et al. | |
| 7,483,958 B1 | 1/2009 | Elabbady et al. | |
| 7,484,103 B2 | 1/2009 | Woo et al. | |
| 2001/0042043 A1 | 11/2001 | Shear et al. | |
| 2001/0051928 A1 | 12/2001 | Brody | |
| 2002/0003880 A1 | 1/2002 | Kato et al. | |
| 2002/0016919 A1 | 2/2002 | Sims, III | |
| 2002/0026636 A1 | 2/2002 | LeComte | |
| 2002/0041686 A1 | 4/2002 | Moriyama et al. | |
| 2002/0046178 A1 | 4/2002 | Morito et al. | |
| 2002/0069420 A1 | 6/2002 | Russell et al. | |
| 2002/0073229 A1 | 6/2002 | Hayashi | |
| 2002/0094207 A1 | 7/2002 | Richards et al. | |
| 2002/0107803 A1 | 8/2002 | Lisanke et al. | |
| 2002/0107806 A1 | 8/2002 | Higashi et al. | |
| 2002/0126842 A1 | 9/2002 | Hollar | |
| 2002/0141577 A1 | 10/2002 | Ripley et al. | |
| 2002/0157002 A1 | 10/2002 | Messerges et al. | |
| 2003/0051153 A1 | 3/2003 | Andreaux et al. | |
| 2003/0076955 A1* | 4/2003 | Alve et al. | 380/201 |
| 2003/0078891 A1 | 4/2003 | Capitant | |
| 2003/0084306 A1 | 5/2003 | Abburi et al. | |
| 2003/0097655 A1 | 5/2003 | Novak | |
| 2003/0131252 A1 | 7/2003 | Barton | |
| 2003/0167392 A1* | 9/2003 | Fransdonk | 713/156 |
| 2003/0187801 A1 | 10/2003 | Chase et al. | |
| 2003/0198351 A1 | 10/2003 | Foster et al. | |
| 2003/0212905 A1 | 11/2003 | Tran et al. | |
| 2003/0217011 A1 | 11/2003 | Peinado et al. | |
| 2003/0236978 A1 | 12/2003 | Evans et al. | |
| 2004/0039707 A9 | 2/2004 | Ricci | |
| 2004/0093372 A1 | 5/2004 | Chen et al. | |
| 2004/0102987 A1 | 5/2004 | Takahashi et al. | |
| 2004/0103297 A1 | 5/2004 | Risan et al. | |
| 2004/0117483 A1 | 6/2004 | Singer et al. | |
| 2004/0117635 A1 | 6/2004 | Karaoguz et al. | |
| 2004/0139027 A1 | 7/2004 | Molaro | |
| 2004/0143736 A1 | 7/2004 | Cross et al. | |
| 2004/0168184 A1* | 8/2004 | Steenkamp et al. | 725/31 |
| 2005/0071375 A1 | 3/2005 | Houghton et al. | |
| 2005/0273608 A1* | 12/2005 | Kamperman | 713/169 |
| 2006/0031257 A1 | 2/2006 | Lipscomb et al. | |
| 2006/0085349 A1 | 4/2006 | Hug | |
| 2006/0117379 A1 | 6/2006 | Bennett et al. | |
| 2006/0159109 A1 | 7/2006 | Lamkin et al. | |
| 2006/0242083 A1 | 10/2006 | Chavez | |
| 2006/0259770 A1 | 11/2006 | Peinado | |
| 2007/0112948 A1* | 5/2007 | Uhlik | 709/223 |

FOREIGN PATENT DOCUMENTS

| | | |
|---|---|---|
| JP | 2002-198957 A | 7/2002 |
| WO | WO 99/60568 | 11/1999 |
| WO | WO 00/62505 | 10/2000 |
| WO | WO 01/46786 | 6/2001 |
| WO | WO 01/65862 A2 | 9/2001 |
| WO | WO 01/75876 | 10/2001 |
| WO | WO 02/03211 | 1/2002 |
| WO | WO 03/039155 | 5/2003 |

OTHER PUBLICATIONS

Office Action dated Aug. 22, 2006 in U.S. Appl. No. 10/403,993.
Office Action dated Apr. 10, 2007 in U.S. Appl. No. 10/686,956.
Final Office Action dated May 1, 2008 in U.S. Appl. No. 10/686,956.
Final Office Action dated Apr. 9, 2008 in U.S. Appl. No. 10/687,357.
Office Action issued in U.S. Appl. No. 10/686,686 on Aug. 1, 2008.
Office Action dated Nov. 1, 2007 in U.S. Appl. No. 10/686,956.
Office Action dated Oct. 10, 2007 in U.S. Appl. No. 10/687,357.
Office Action dated Jan. 31, 2008 in U.S. Appl. No. 10/686,955.
DVB-: "Call for proposals for content protection & copy management technologies" DVB CPT Rev 1.2, Jul. 5, 2001, XP002230687, www, Retrieved from the Internet: URL:http://www.cptwg.org/Assets/DVB-CPT-CfP_rev1.2.PDF 'retrieved on Feb. 10, 2003'. p. 1-p. 23.
IBM: "IBM Response to DVB-CPT Call for Proposals for Content Protection & Copy Management: XCP Cluster Protocol" Internet. Oct. 19, 2001, XP001148193. www. Retrieved from the Internet: <UPL:http://www.almaden.ibm.com/software/ds/contentassurance/papers/xcp_dvb.p>, p. 3-p. 32.
Office Action issued in U.S. Appl. No. 10/686,686 on May 7, 2009.
Office Action issued in U.S. Appl. No. 10/687,357 on May 29, 2009.
Notice of Preliminary Rejection issued in Korean Patent Application No. 10-2007-7006067 on Jun. 2, 2009.
Notice of Preliminary Rejection issued in Korean Patent Application No. 10-2007-7006070 on Jun. 2, 2009.
Notice of Preliminary Rejection issued in Korean Patent Application No. 10-2007-7006072 on Jun. 1, 2009.
Korean Patent Application Publication No. 2002-0029657 published on Apr. 19, 2002.
Notice of Preliminary Rejection issued in Korean Patent Application No. 10-2007-7006071 on May 26, 2009.
Official Action issued in Japanese Patent Application No. 2005-502636 on Aug. 3, 2009.
Japanese Patent Application No. 2002-308406 (JP 2004-5365A) published on Jan. 8, 2004.
Official Action issued in U.S. Appl. No. 10/686,956 on Jul. 22, 2009.
Office Action issued in U.S. Appl. No. 10/687,357 on Dec. 7, 2009.
Office Action issued in U.S. Appl. No. 10/686,956 on Jul. 22, 2009.
Extended European Search Report dated Apr. 23, 2012 for related European Application No. 10185845.4, 9 pages.
Extended European Search Report dated Apr. 23, 2012 for related European Application No. 10185851.2, 9 pages.

* cited by examiner

100

FIG. 15
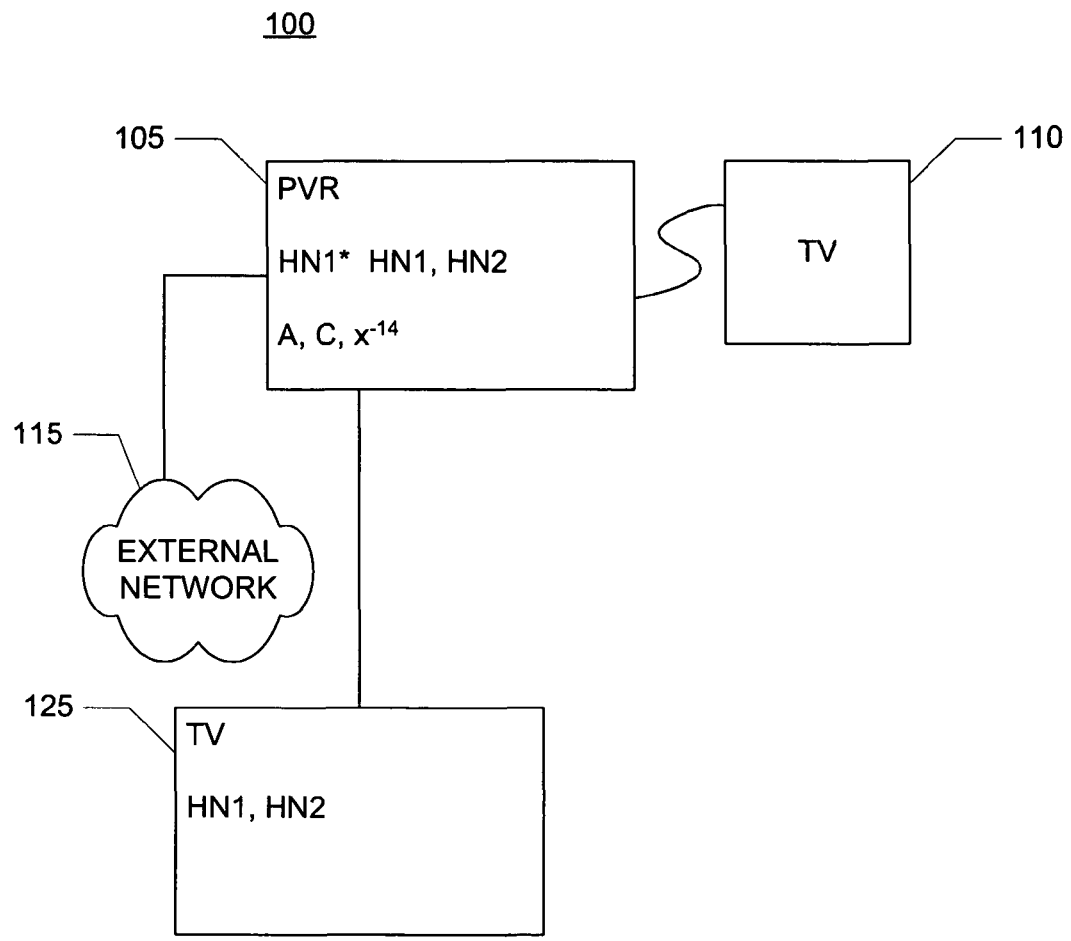
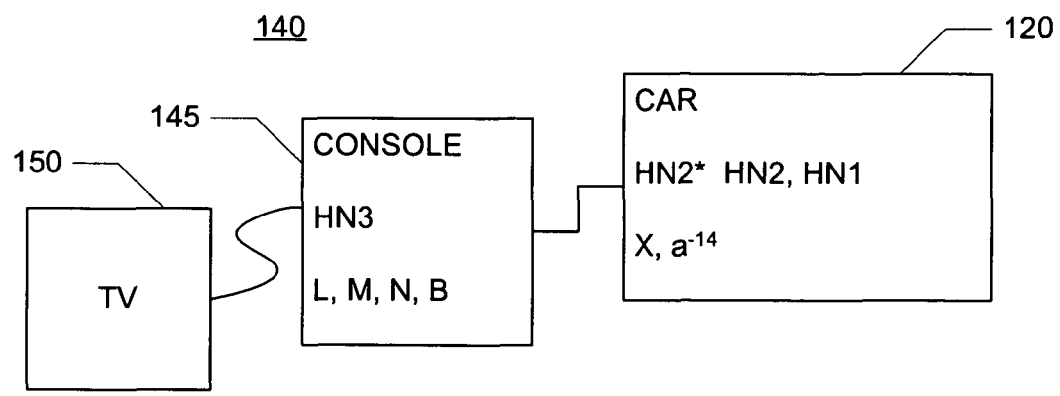

FIG. 27
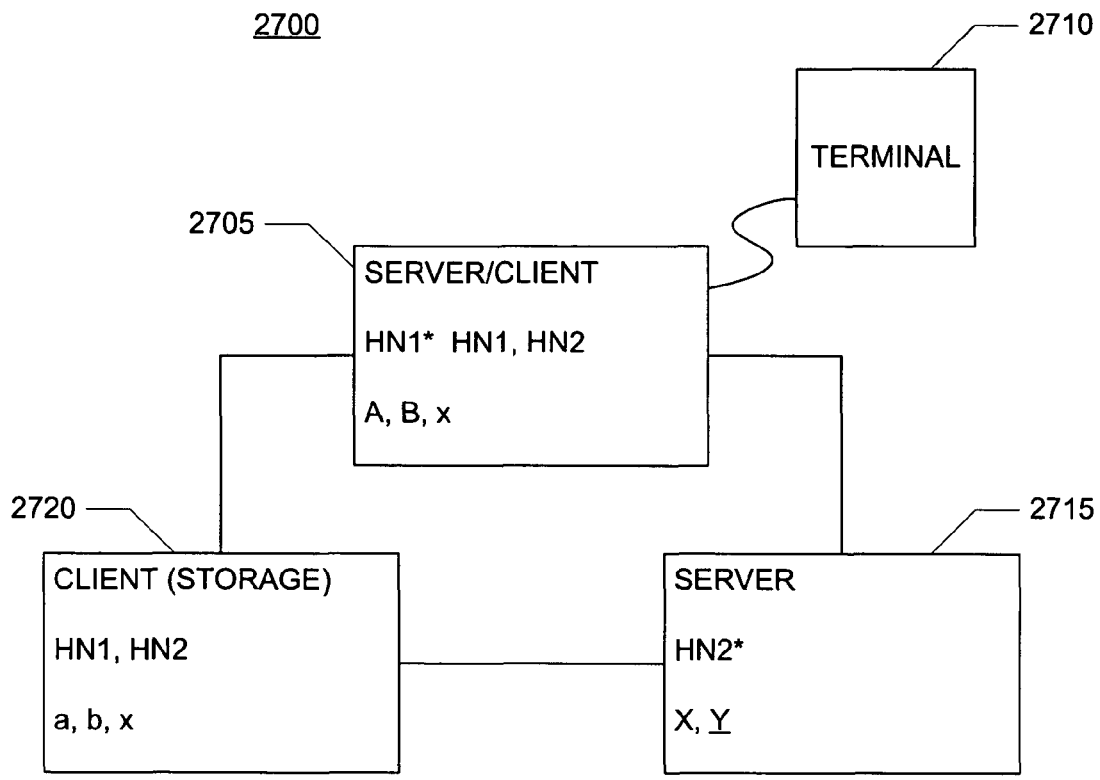
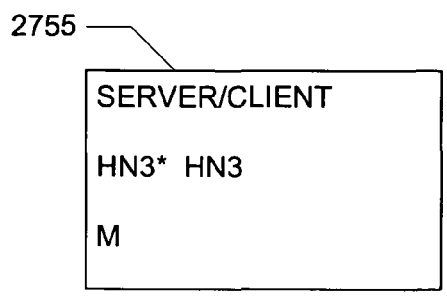

FIG. 29
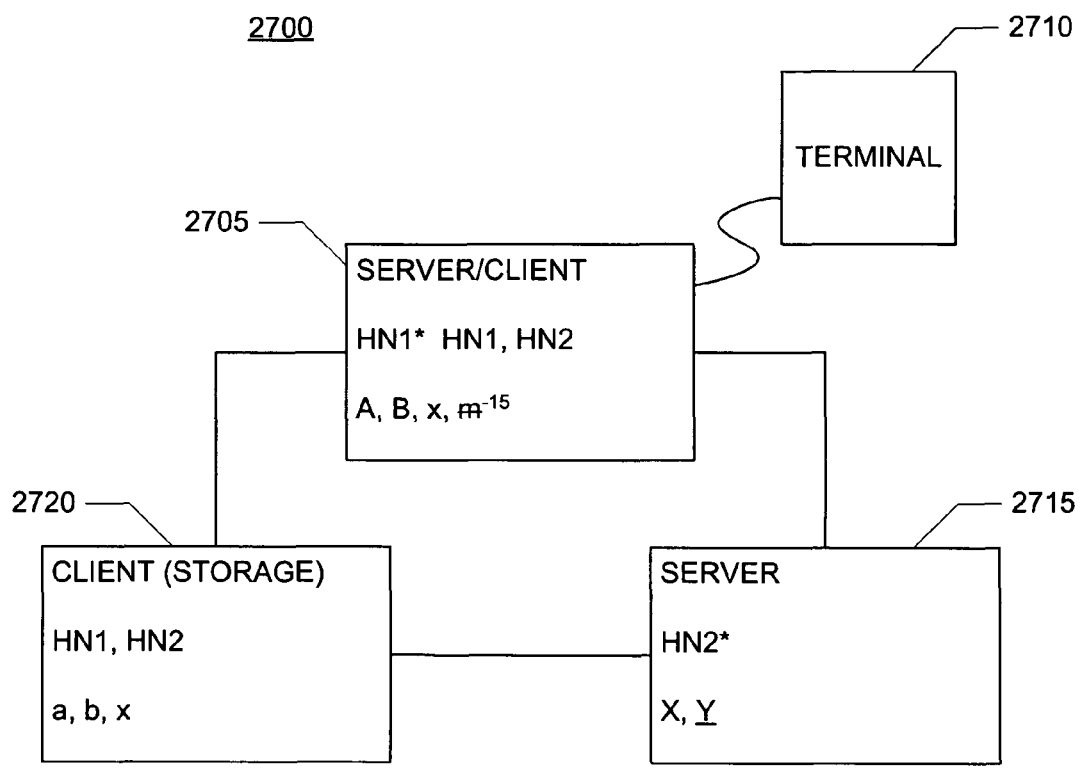
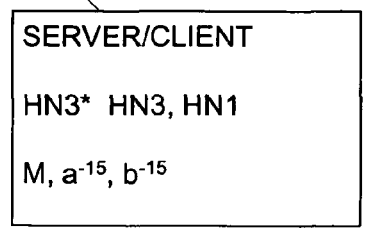

NETWORK MANAGEMENT IN A MEDIA NETWORK ENVIRONMENT

RELATED APPLICATIONS

This application claims the benefit of U.S. Provisional Patent Application No. 60/434,774, filed Dec. 17, 2002, and U.S. Provisional Patent Application No. 60/471,823, filed May 20, 2003, the disclosures of which are incorporated herein by reference.

BACKGROUND

Audio and video media content, such as music and movies, is becoming increasingly available in various digital forms, such as in electronic files stored on optical storage (e.g., CDs and DVDs) or magnetic storage (e.g., hard disks). The digital content provides both high quality of reproduction and convenient access for users. Another benefit of digital content is that it is typically easy to create a high quality copy of the content. Users enjoy accessing the digital content through various devices in multiple locations. However, content owners are often concerned with uncontrolled and unauthorized copying and resulting potential problems, such as piracy.

SUMMARY

The present disclosure provides methods and apparatus for managing devices and content in a network environment. In one implementation, a method of adding a client as a member of a hub network includes: detecting a client connected to a server in a hub network; authenticating said client; authorizing said client; and adding said client as a member in said hub network.

In another implementation, a method of adding a client as a member of a hub network includes: sending a connection notification from a client to a server in a hub network; sending identification information from said client to said server; and receiving an add confirmation at said client from said server; wherein said add confirmation indicates said client has been added as a member in said hub network.

In another implementation, a method of adding a client as a member of a hub network includes: authenticating a client through an intermediary device connected to a server in a hub network; authorizing said client through said intermediary device; and adding said client as a member in said hub network through said intermediary device; wherein said client is not connected to said server.

In another implementation, a method of adding a client as a member of a hub network includes: sending a connection notification from a client to a server in a hub network through an intermediary device connected to said server; sending identification information from said client to said server through said intermediary device; and receiving an add confirmation at said client from said server through said intermediary device; wherein said add confirmation indicates said client has been added as a member in said hub network.

In another implementation, a method of removing a client as a member of a hub network includes: triggering removal of a client as a member of a hub network; disabling all licenses stored by said client corresponding to content data bound to said hub network; and removing said client as a member in said hub network so that said client is no longer a member of said hub network.

In another implementation, a method of reconnecting a client to a hub network includes: detecting a client connected to a hub network; authenticating said client as a member of said hub network; and authorizing said client.

In another implementation, a method of disconnecting a client from a hub network includes: disconnecting a client from a hub network; setting an expiration time for a license stored on said client; and comparing said expiration time to a clock of said client; wherein said license corresponds to locked content data stored on said client and is bound to said hub network.

BRIEF DESCRIPTION OF THE DRAWINGS

FIGS. 1-16 illustrate one example of configuration and operation of one implementation of a media network environment.

FIGS. 27-29 illustrate an example of disconnecting a device from a hub network and the operation of expiration periods.

DETAILED DESCRIPTION

The present invention provides methods and apparatus for managing devices and content in a network environment. In one implementation, a collection of devices is interconnected in a media network environment defining multiple hub networks of client-server relationships. In a hub network, a server provides access to content to clients by streaming content or sending copies to the clients. The server and clients work together to manage membership in the hub network, connection and disconnection with the hub network, content distribution in the hub network, and the state of content in the hub network.

In general, the following terms are used herein with the following meanings. "Content" refers to the audio and/or video of an item of media, such as a movie or song. One item of content is one particular item of media, such as one movie. "Content data" refers to the data representing an item of content. An "instance" is a logical collection of data including the content data for an item of content. Accordingly, content data of an instance of content is, for example, moved and played (rendered). "Play" and "present" refer to rendering and displaying the content data of an instance of content or otherwise presenting the content data according to the type of content (e.g., presenting audio and video for a movie or presenting audio for a song). Similarly, "presenting an instance" refers to rendering and displaying the content data of an instance. A "license" refers to the data storing the permissions for using content data, such as whether content data is permitted to be played or copied by a device. Descriptions herein of what can and cannot be done with an instance or content data refer to permissions set by a license associated with the instance or content data, as appropriate.

ILLUSTRATIVE EXAMPLE

FIGS. 1-16 illustrate one example of configuration and operation of one implementation of a media network environment.

Figure 1:
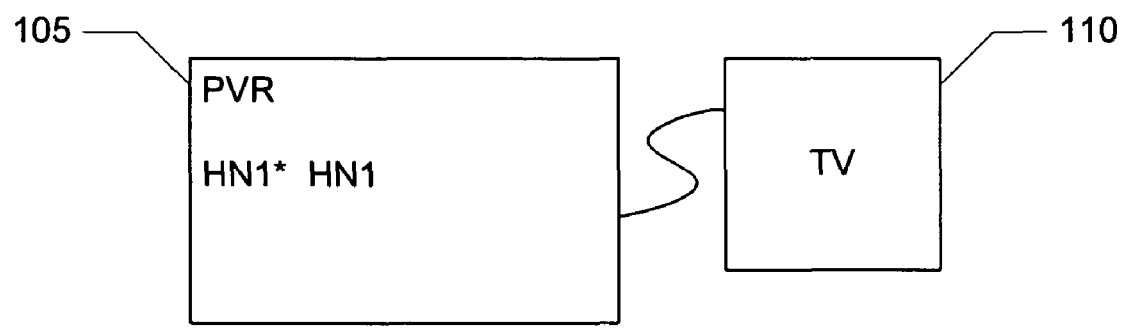

In FIG. 1, a user Jim has established a home media network environment 100 including two devices: a PVR (personal video recorder) 105 connected to a television 110. The PVR 105 is a media network compliant device, meaning that the PVR 105 operates according to the processes defined for a device that is a member of a hub network. The PVR 105 includes storage for storing copies of content (e.g., as electronic files stored on a hard disk) and is a server device. As a server device, the PVR 105 is the server for a hub network and can provide content to client devices that are members in the hub network. As a server, the PVR 105 also defines a local environment (not shown). In this example, the local environment for the PVR 105 is defined as a physical area relative to the position of the PVR 105 (e.g., determined by round trip packet timing or GPS information). The PVR 105 is also a client device. As a client device, the PVR 105 can render content directly or through a connected terminal device, such as through the connected television 110. As both a client and server device, the PVR 105 is a member of a hub network as the server for the hub network and as a client in the hub network. In FIG. 1, the PVR 105 is marked with "HN1" to indicate that the PVR 105 is a client device for hub network 1 (HN1). The PVR 105 is also marked with "HN1*" to indicate that the PVR 105 is the server in HN1.

The television 10 is not a media network compliant device, and so cannot become a member of a hub network. However, a non-compliant device can be a terminal device for a hub network, receiving data for presentation (e.g., displaying the video and outputting the audio for a movie), without storing the data for the content (beyond transiently). Accordingly, the PVR 105 renders content by outputting data for the content for presentation to the connected television 110.

As a server device, the PVR 105 initially sets up the hub network HN1. The PVR 105 checks for other compliant devices connected to the PVR 105. Before adding a device as a member to the hub network HN1, the PVR 105 authenticates a device, confirming the identity of the device, and authorizes an authenticated device, confirming that the device is a compliant device. If the PVR 105 does not authenticate and authorize a device, the PVR 105 does not add that device to the hub network HN1. In FIG. 1, the PVR 105 is the only compliant device. The PVR 105 adds itself to the hub network as the server and as a client. The television 110 is not a compliant device, and so the PVR 105 does not add the television 110 as a member.

Figure 2:
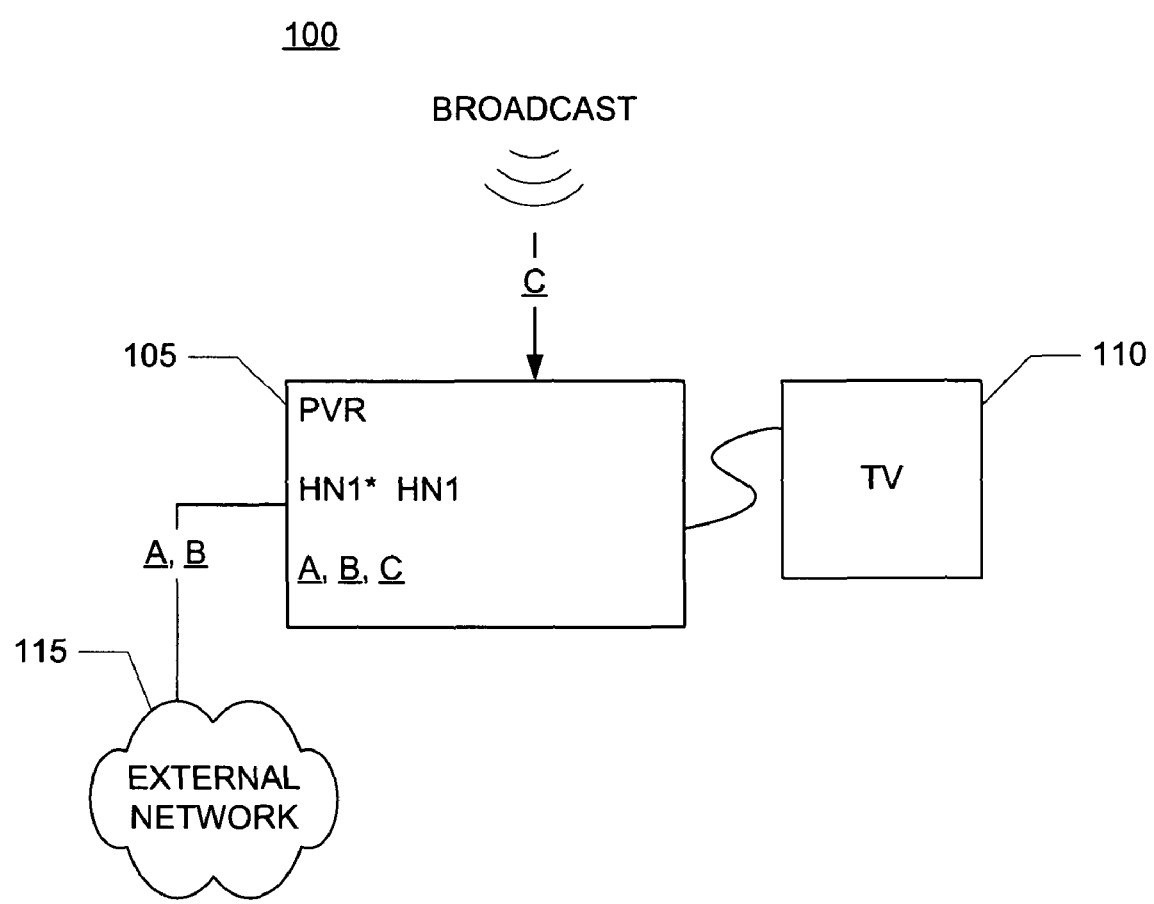

In FIG. 2, Jim has purchased movie A and movie B, and recorded television program C. In this example, Jim purchased movies A and B as electronic files downloaded from a network 115 connected to the PVR 105. Jim recorded program C as an electronic file from a broadcast received by an integrated receiver of the PVR 105.

As discussed below, an instance that is compliant with hub network operation is in one of two exclusive states: discrete or bound. A discrete instance is independent of any hub network and can be played or presented through any compliant device (according to the license of the discrete instance). However, a compliant device cannot make a usable copy of a discrete instance. A discrete instance includes locked content data and a discrete license. The locked content data of the discrete instance is referred to as the "discrete version" of the locked content data. The locked content data is locked by being protected from unauthorized access, such as by encryption. A bound instance is bound to one hub network. The bound instance is one logical instance represented by locked content data and corresponding licenses stored on the server of the hub network and on zero or more of the clients of the hub network. The locked content data stored by the server is the source for copies of the content data in the hub network and is the "source version." Copies of the source version content data are stored on clients and are "sub-copy versions" (though some or all of the data in the discrete version, the source version, and/or any of the sub-copy versions can be the same). A bound instance can only be played or presented through a compatible compliant device that is a member of that hub network. Members of that hub network can make sub-copies of the content data of a bound instance.

A server device can change the state of a discrete instance from discrete to bound, disabling the discrete instance and enabling a bound instance. A disabled instance is rendered unusable (e.g., through deletion or encryption of the content data of the instance or disabling the license(s) for the instance). A server device can also change the state of a bound instance from bound to discrete, disabling the bound instance (including any corresponding sub-copies) and enabling a discrete instance. In addition, the server for a hub network manages root responsibility for a bound instance. Root responsibility includes issuing and managing the licenses for the content data of the bound instance in the hub network. Accordingly, the server holds a root license defining permissions for presenting the bound instance and for managing the content data and licenses of the bound instance in the hub network. When a new sub-copy is created, a license is also created for the sub-copy from the root license. An instance of content that is not compliant with hub network operation is a non-compliant instance. A compliant device will play or copy a non-compliant instance according to whatever recognized copy control information may be associated with the instance.

In FIGS. 2-16, letter labels indicate the versions of locked content data of instances of content. The version of the locked content data, and so also the state of the instance corresponding to the locked content data, is indicated by variations of the letter. Underlining indicates a discrete version of content. For example, a discrete version of the movie A is indicated by "A". An uppercase letter without underlining indicates a source version of locked content data, stored on a server. For example, the source version of the movie A is indicated by "A". A lowercase letter indicates a sub-copy version of locked content data. For example, a sub-copy version of the movie A is indicated by "a". The versions also have corresponding licenses (not shown in FIGS. 2-16): a discrete version has a discrete license, a source version has a root license, and a sub-copy version has a sub-copy license.

Returning to FIG. 2, Jim introduces the movies A and B to the hub network HN1 through the PVR 105 by storing the discrete versions A and B in the PVR 105. The PVR 105 also stores a discrete version C of the program C.

Figure 3:
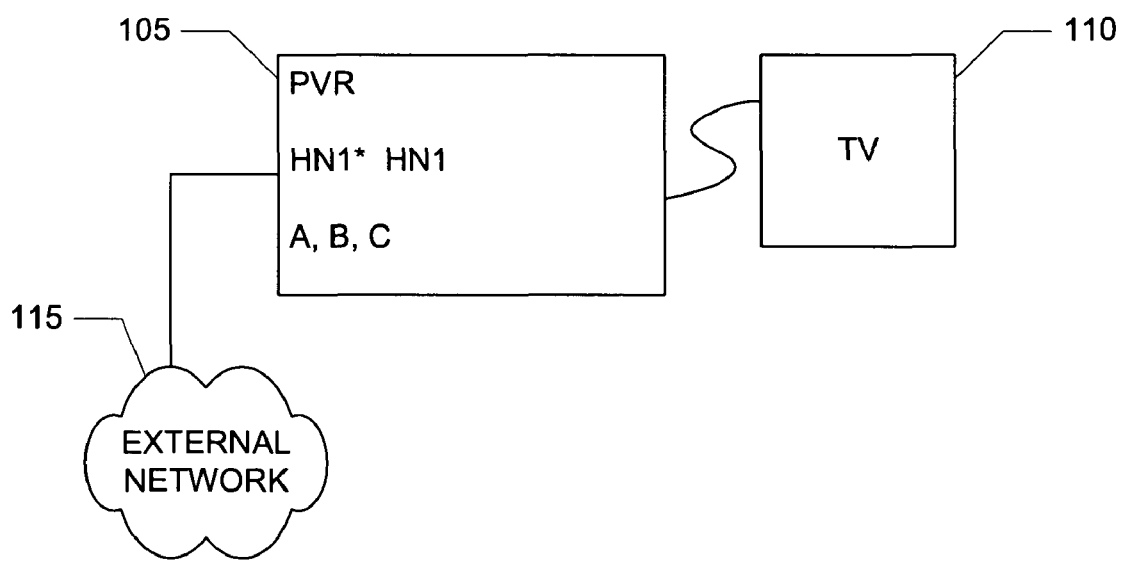

In FIG. 3, Jim binds the discrete instances to the hub network HN1. The PVR 105 changes the state of the discrete instances for the discrete versions A, B, and C to be bound instances, and so creates source versions A, B, and C. The PVR 105 disables or deletes the discrete versions A, B and C.

Figure 4:
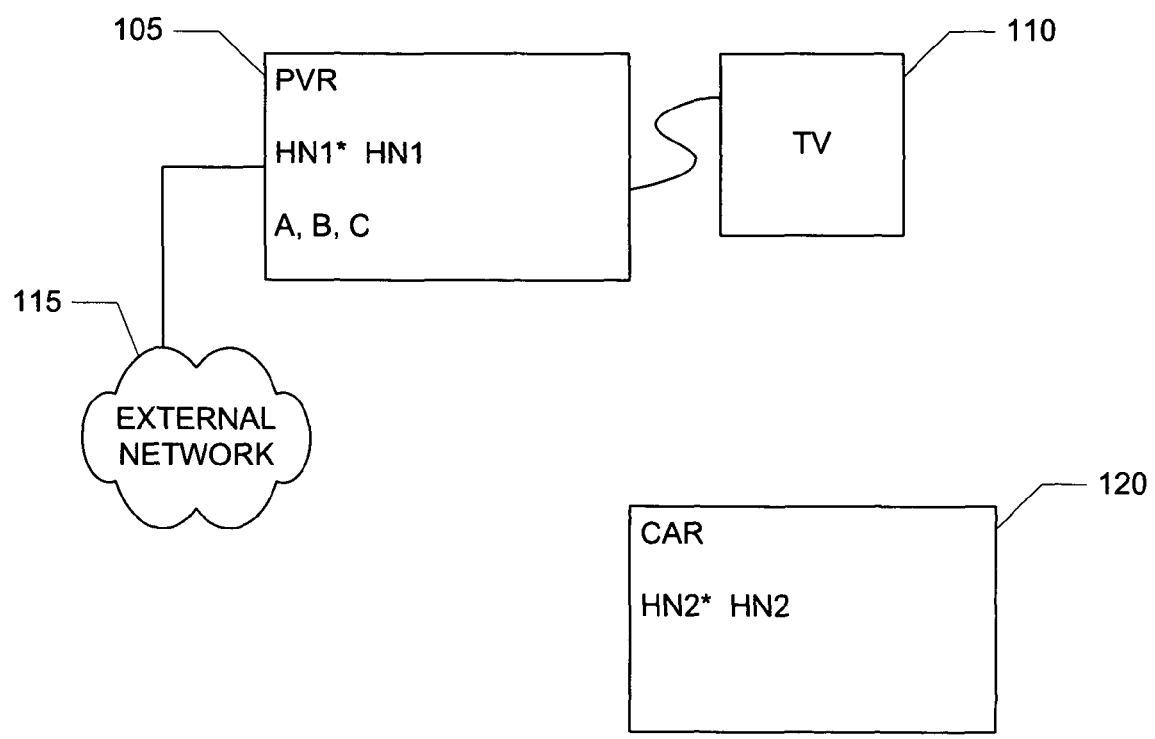

In FIG. 4, Jim buys a car 120 that includes a compliant device. The car 120 is a server device (e.g., including storage) and a client device (e.g., including audio and video systems). The car 120 establishes a second hub network HN2, with the car 120 as the server (indicated by "HN2*") and as a member client (indicated by "HN2"). The car 120 defines a second local environment (not shown) based on relative distance from the car 120 (e.g., the car 120 includes components that determine round trip packet time or that provide GPS information defining the position of the car 120). In FIG. 4, the car 120 and the PVR 105 are physically close to one another and so the local environment of the car 120 is substantially coextensive with the local environment of the PVR 105.

Figure 5:
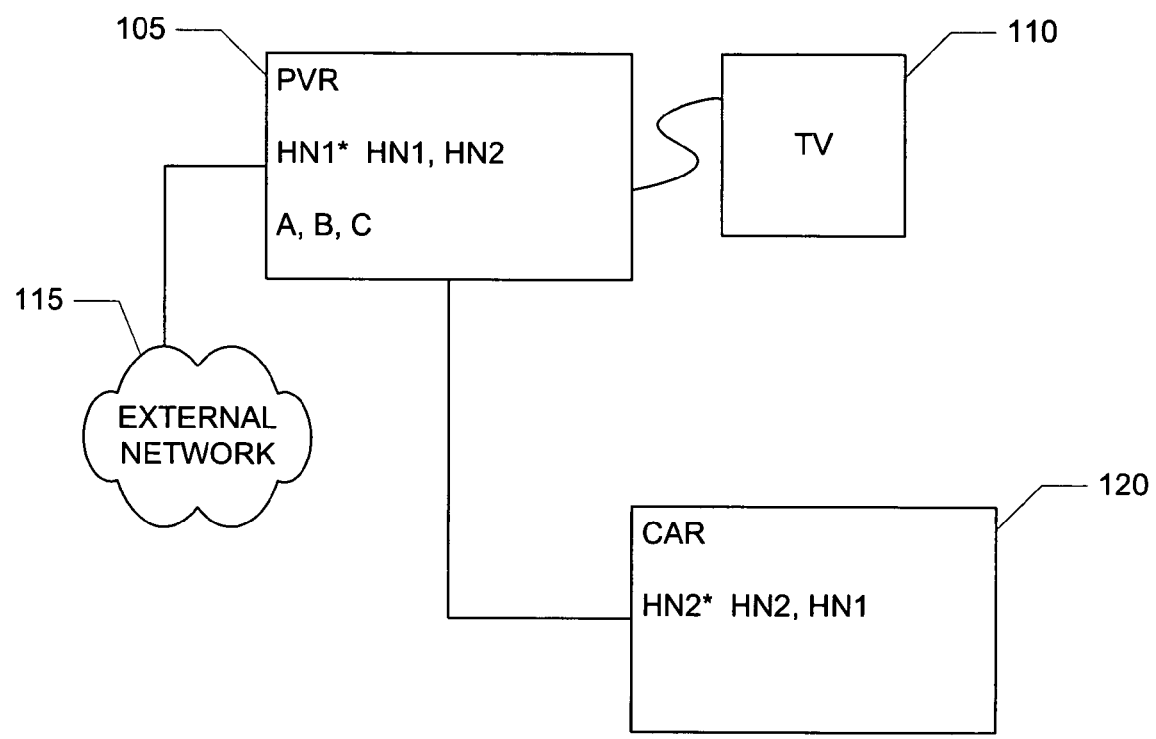

In FIG. 5, Jim connects the two hub networks HN1 and HN2. Each of the PVR 105 and the car 120 includes wireless network capability. Jim causes the PVR 105 and the car 120 to establish a wireless connection. When the PVR 105 and the car 120 detect one another, each authenticates and authorizes the other to be added as member devices. Accordingly, the PVR 105 adds the car 120 as a member to the hub network HN1 (indicated by the "HN1" label added to the car 120), and the car 120 adds the PVR 105 as a member to the hub network HN2 (indicated by the "HN2" label added to the PVR 105).

Figure 6:
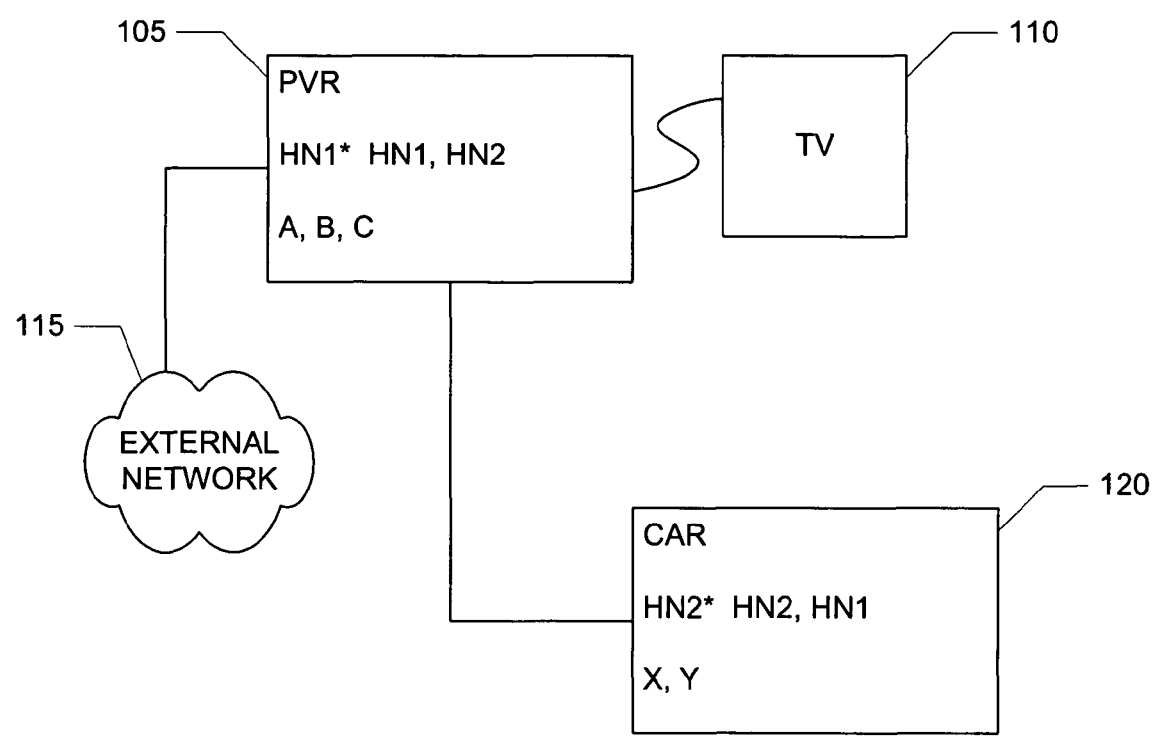

In FIG. 6, Jim introduces more content to the second hub network HN2. Jim buys a compliant instance of a movie X stored on an article of compliant media, such as a compliant optical disc. Compliant media operates according to the processes defined for content that can be ingested into (made bound) and freed from (made discrete) a hub network. In particular, compliant media allows an instance stored on the compliant media to be disabled and enabled according to changes in state of the instance (e.g., when changing between discrete and bound). In addition, compliant media is configured so that devices will not create a complete bit-by-bit copy of the data stored on the compliant media, without authorization. Because the instance stored on the compliant optical disc is compliant and has not been bound to any hub network yet, the instance is a discrete instance. Jim inserts the compliant optical disc into the server device of the car 120 and causes the car 120 to bind the discrete instance of the movie X to the hub network HN2. The car 120 creates a bound instance of the movie X and stores a source version of locked content data and root license as part of the bound instance in the storage of the car 120 and disables the discrete instance on the compliant optical disc (e.g., by storing data to the optical disc). After the discrete instance on the compliant optical disc has been disabled, the discrete version of the locked content data of the disabled instance cannot be played or presented on another device (as described below, in another implementation, when a discrete instance is bound to a hub network, the then-disabled discrete instance can still be played by member devices in the hub network to which the discrete instance was bound). In FIG. 6, the source version of the movie X is indicated by the "X" label added to the car 120. Similarly, Jim purchases and downloads a compliant instance of a song Y from network 115 and causes the car to bind the instance to the hub network HN2. In FIG. 6, the source version of the song Y is indicated by the "Y" label added to the car 120.

Figure 7:
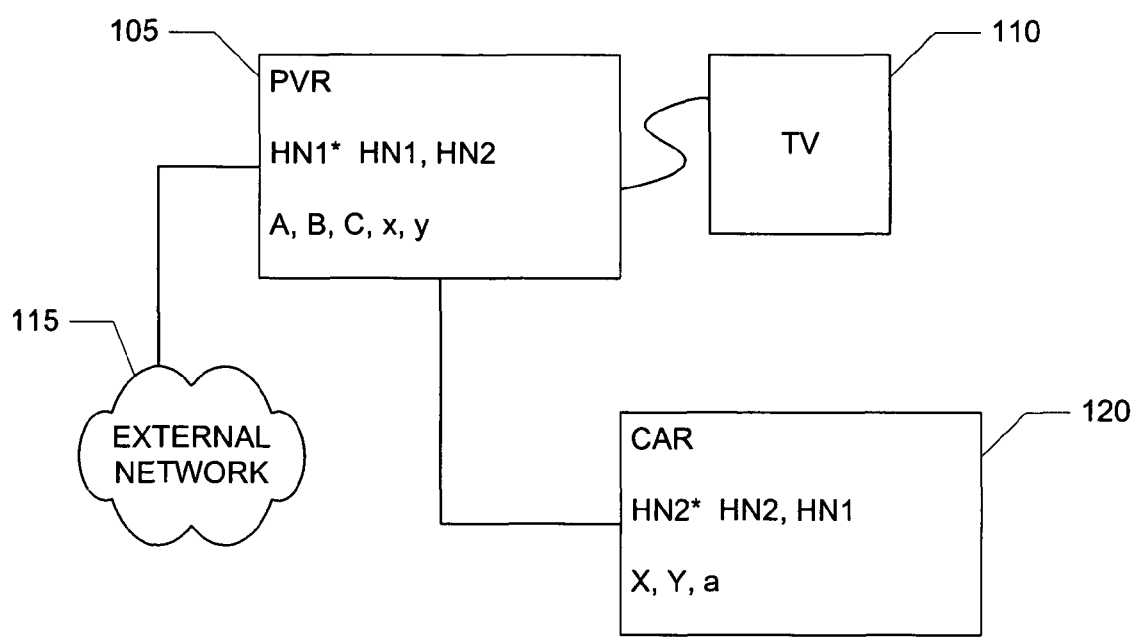

In FIG. 7, Jim accesses content through the hub networks. Jim decides to watch the movie X through the PVR 105 and connected television 110. As a member device of the hub network HN2, the PVR 105 can access the movie X that is bound to the hub network HN2. The PVR 105 requests a copy of the movie X and the car 120, as the server for the hub network HN2, provides a sub-copy version of the movie X to the PVR 105. The PVR 105 stores the sub-copy version of the movie X (indicated by the "x" label added to the PVR 105) and presents the movie X through the connected television 110. Similarly, Jim also decides to listen to the song Y through the PVR 105, and so the PVR 105 stores a sub-copy version of the song Y (indicated by the label "y" added to the PVR 105).

Jim later decides to watch the movie A through the car 120. The PVR 105, as the server for the hub network HN1, provides a sub-copy version of the movie A to the car 120. The car 120 stores the sub-copy version of the movie A (indicated by the "a" label added to the car 120) and presents the movie A.

Figure 8:
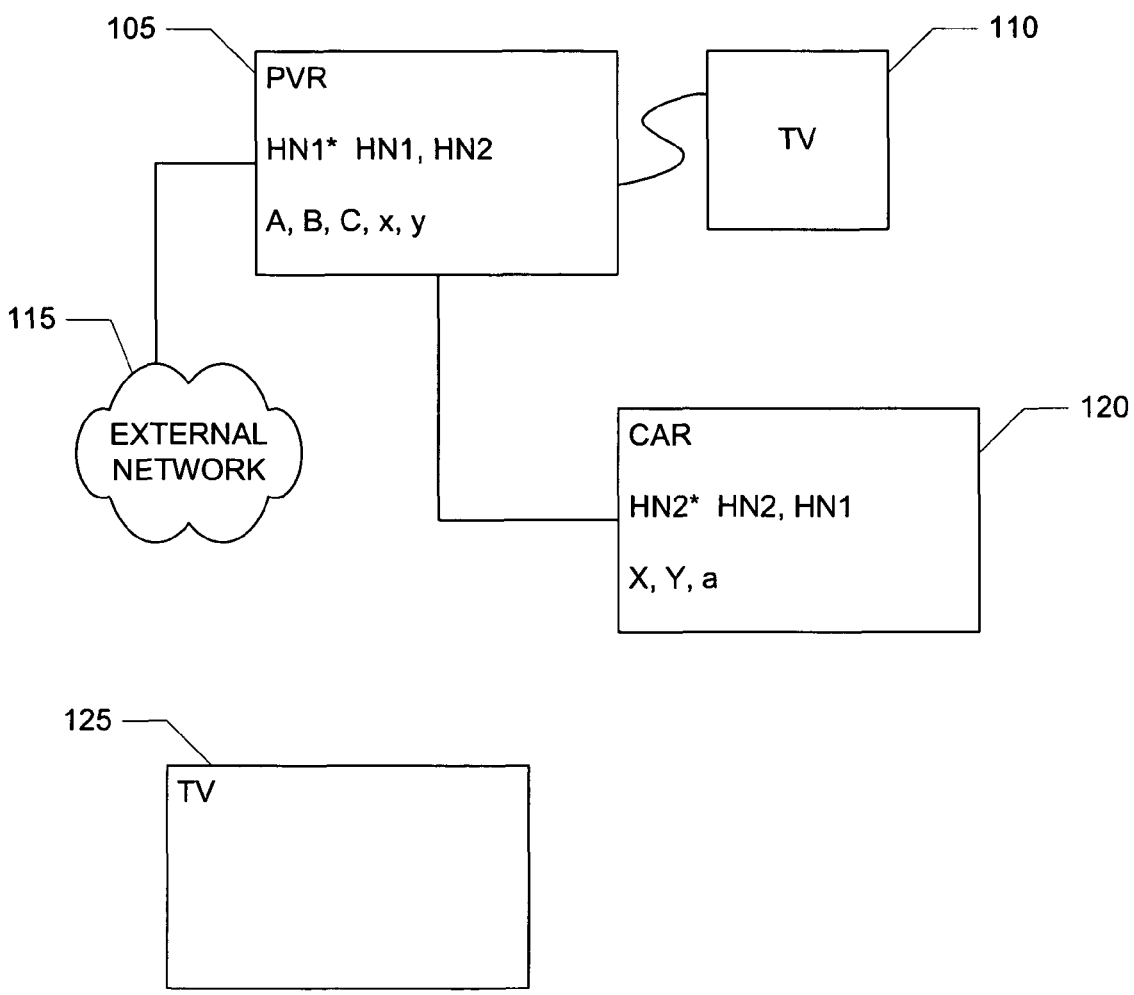

In FIG. 8, Jim buys a television 125 that is a compliant device. The television 125 is a client device, but is not a server device. Accordingly, the television 125 does not form another hub network.

Figure 9:
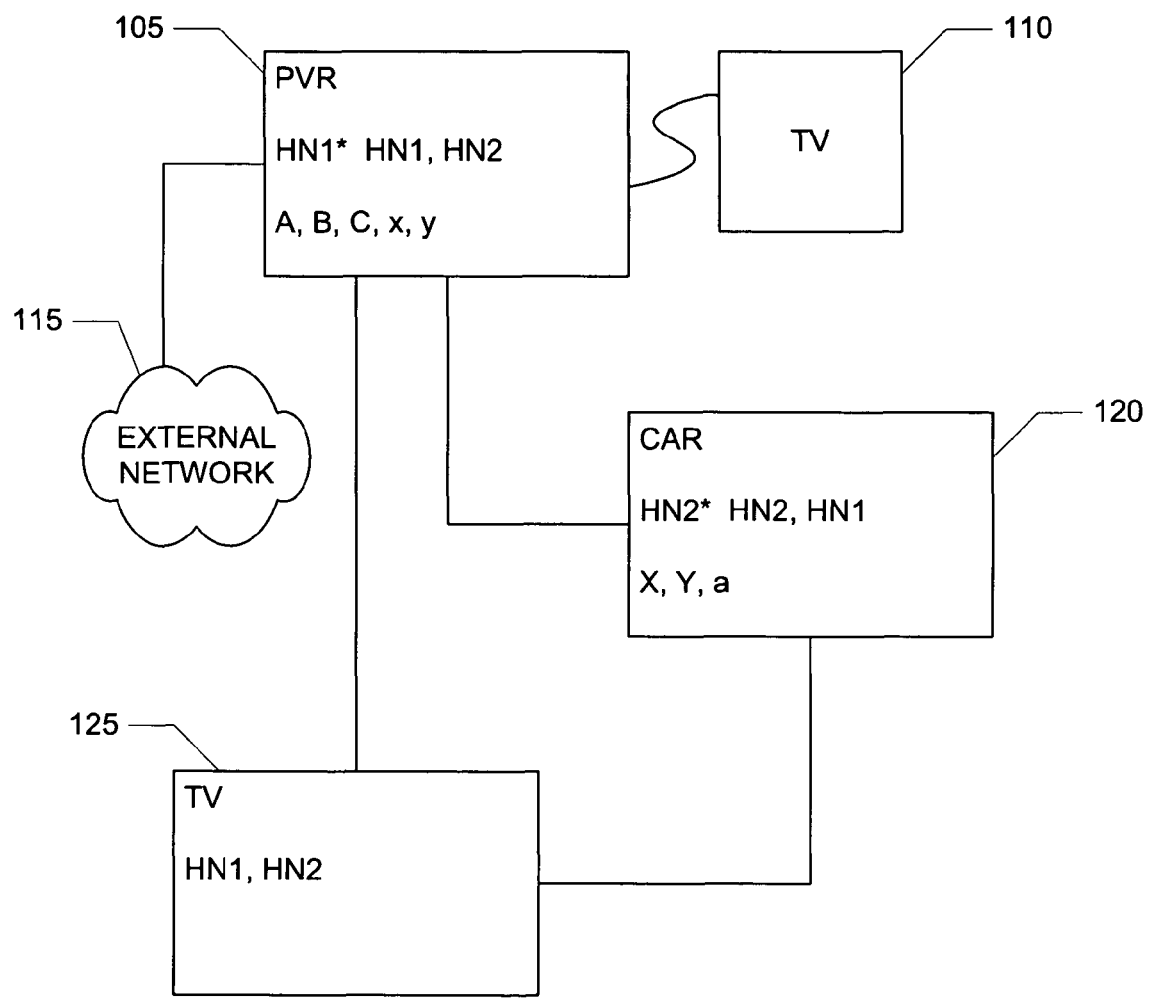

In FIG. 9, Jim connects the television 125 to the hub networks HN1 and HN2. The television 125 supports both wired connections and wireless connections. Jim causes the PVR 105 and the television 125 to establish a wired connection and causes the car 120 and the television 125 to establish a wireless connection. When the PVR 105 detects the television 125, the PVR 105 authenticates and authorizes the television 125 to be added as a member device. Accordingly, the PVR 105 adds the television 125 as a member to the hub network HN1 (indicated by the "HN1" label added to the television 125). Similarly, the car 120 authenticates, authorizes, and adds the television 125 as a member to the hub network HN2 (indicated by the "HN2" label added to the television 125).

Figure 10:
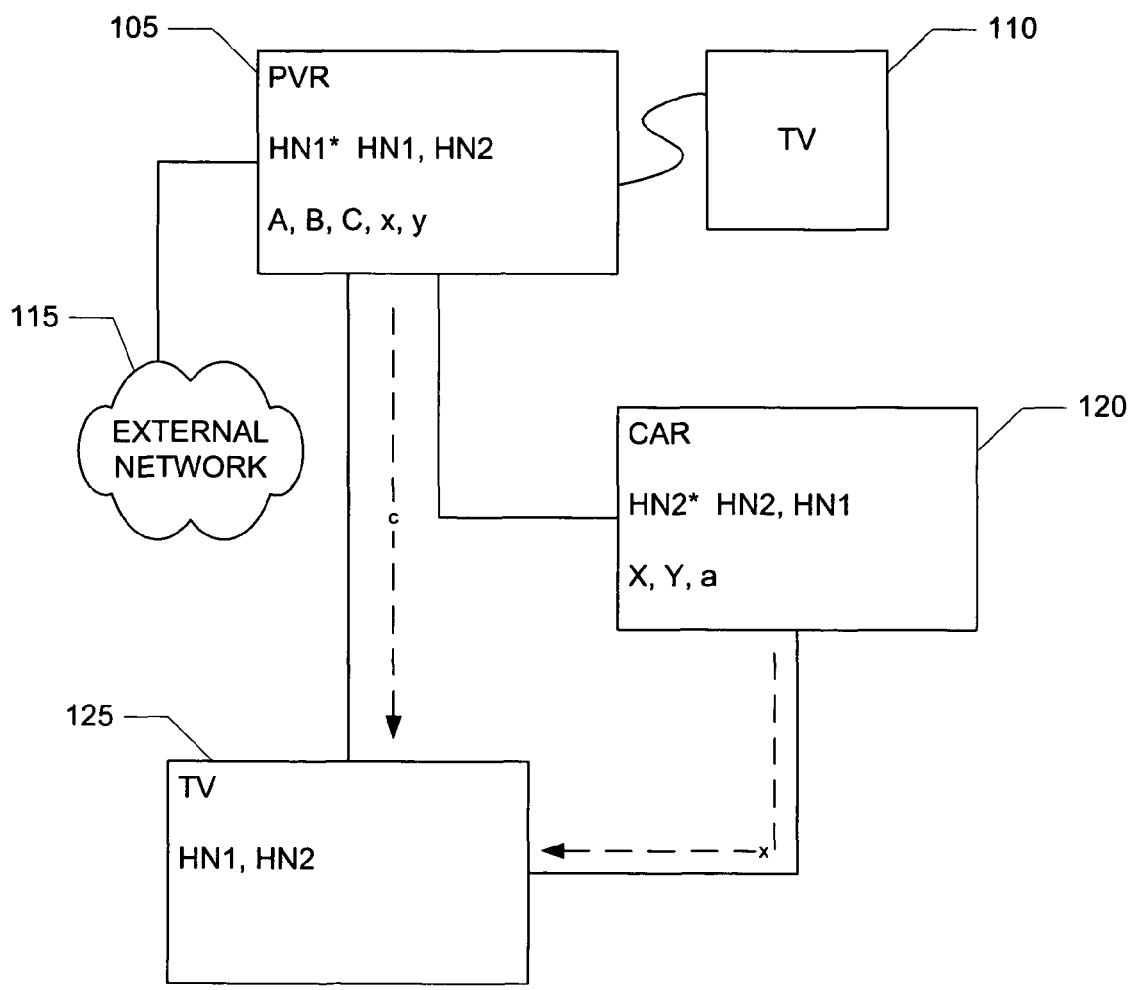

In FIG. 10, Jim accesses content through the television 125. Jim decides to watch the recorded program C through the television 125. As a member device of the hub network HN1, the television 125 can access the program C that is bound to the hub network HN1. The television 125 requests that the PVR 105 stream the program C to the television 125. The PVR 105 streams the program C to the television 125 using the source version C (indicated by the dashed line labeled "c" between the PVR 105 and the television 125). The television 125 does not store a copy of the program C (other than transiently in the process of presenting the streamed program). Similarly, Jim decides to watch the movie X through the television 125, and so the car 120 streams the movie X to the television using the source version X (indicated by the dashed line labeled "x" between the car 120 and the television 125).

Figure 11:
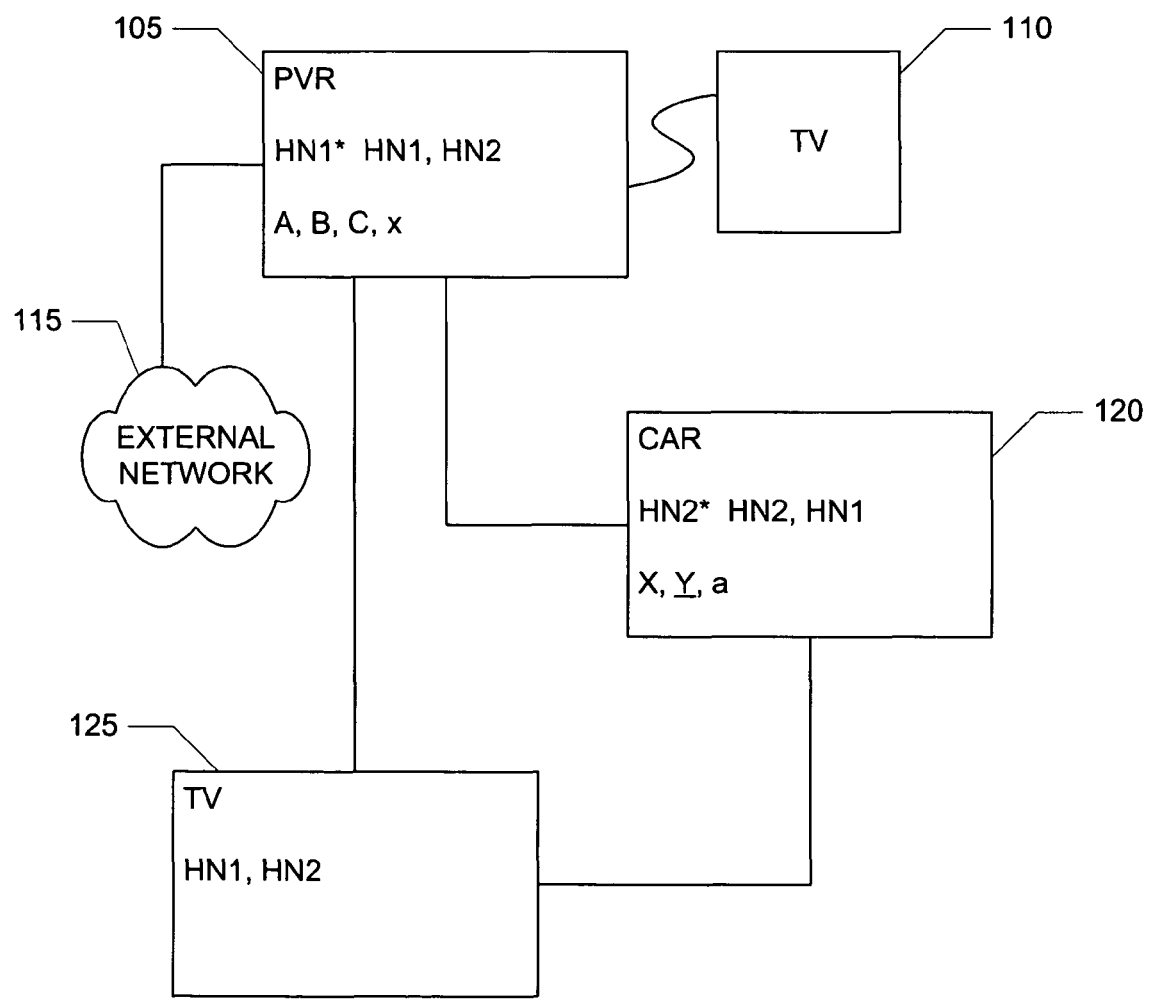

In FIG. 11, Jim decides to free or unbind the song Y from the hub network HN2 to make the song Y portable. Jim requests that the car 120 create a discrete instance of the song Y. The car 120 disables the bound instance of the song Y, disabling the source version and any sub-copy versions of the song Y (indicated by the removal of the label "y" from the PVR 105 and the label "Y" from the car 120). The car 120 creates a discrete instance of the song Y and stores a discrete version (indicated by the label "Y" added to the car 120) on compliant media (e.g., a compliant hard disk or a compliant recordable disc).

Figure 12:
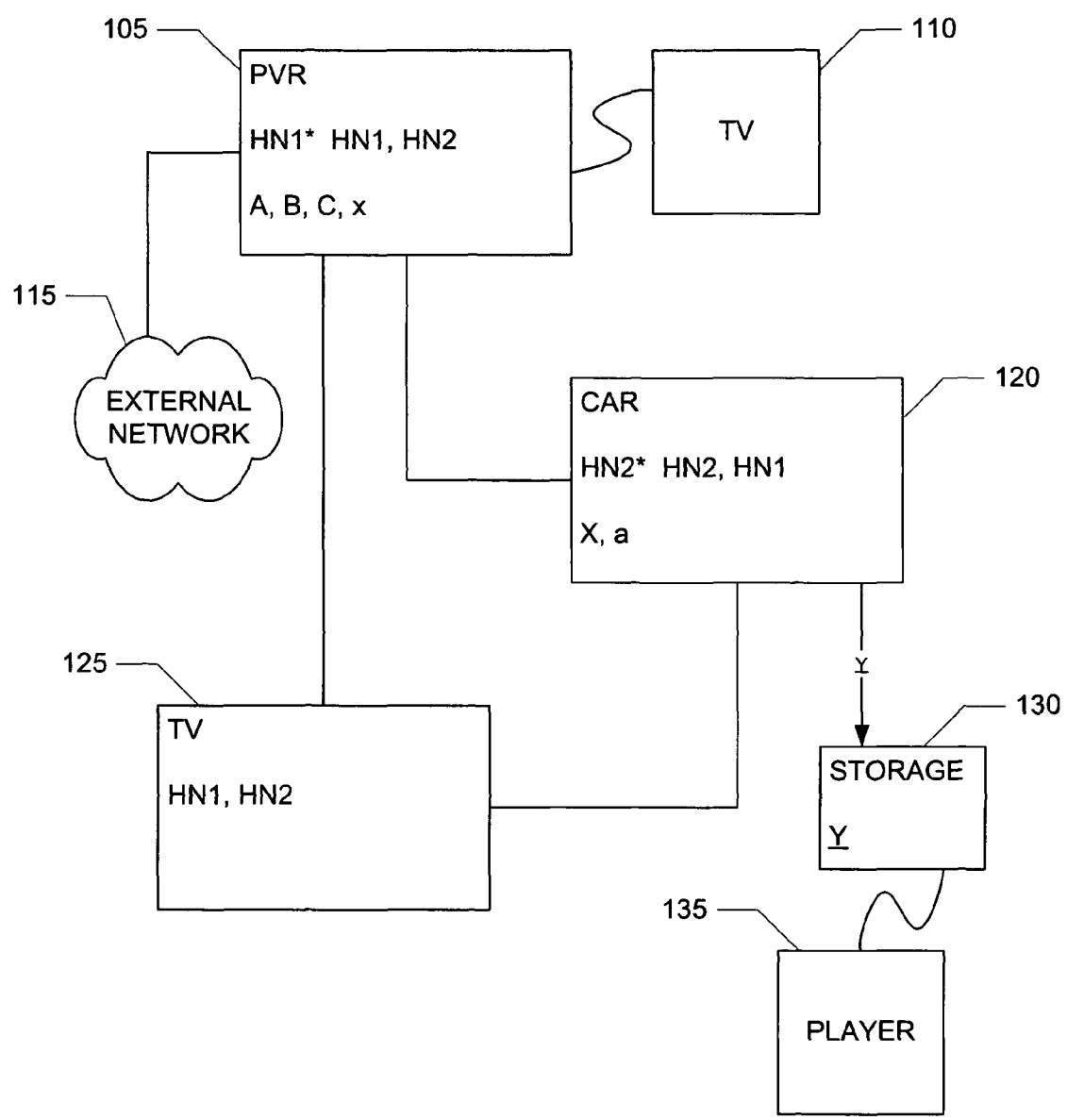

In FIG. 12, Jim removes the song Y from the hub network HN2. Jim connects a compliant portable storage device 130 (e.g., a removable memory card) to the car 120. Jim moves the discrete version of the song Y from the car 120 to portable storage 130 (indicated by the "Y" label removed from the car 120 and added to the portable storage 130) and connects the portable storage 130 to a portable music player 135. The portable music player 135 is a compliant device and is not a member of a hub network, but the player 135 can still play the song Y from the discrete version $\overline{Y}$ because the discrete instance for the discrete version $\overline{Y}$ is not bound to a hub network.

Figure 13:
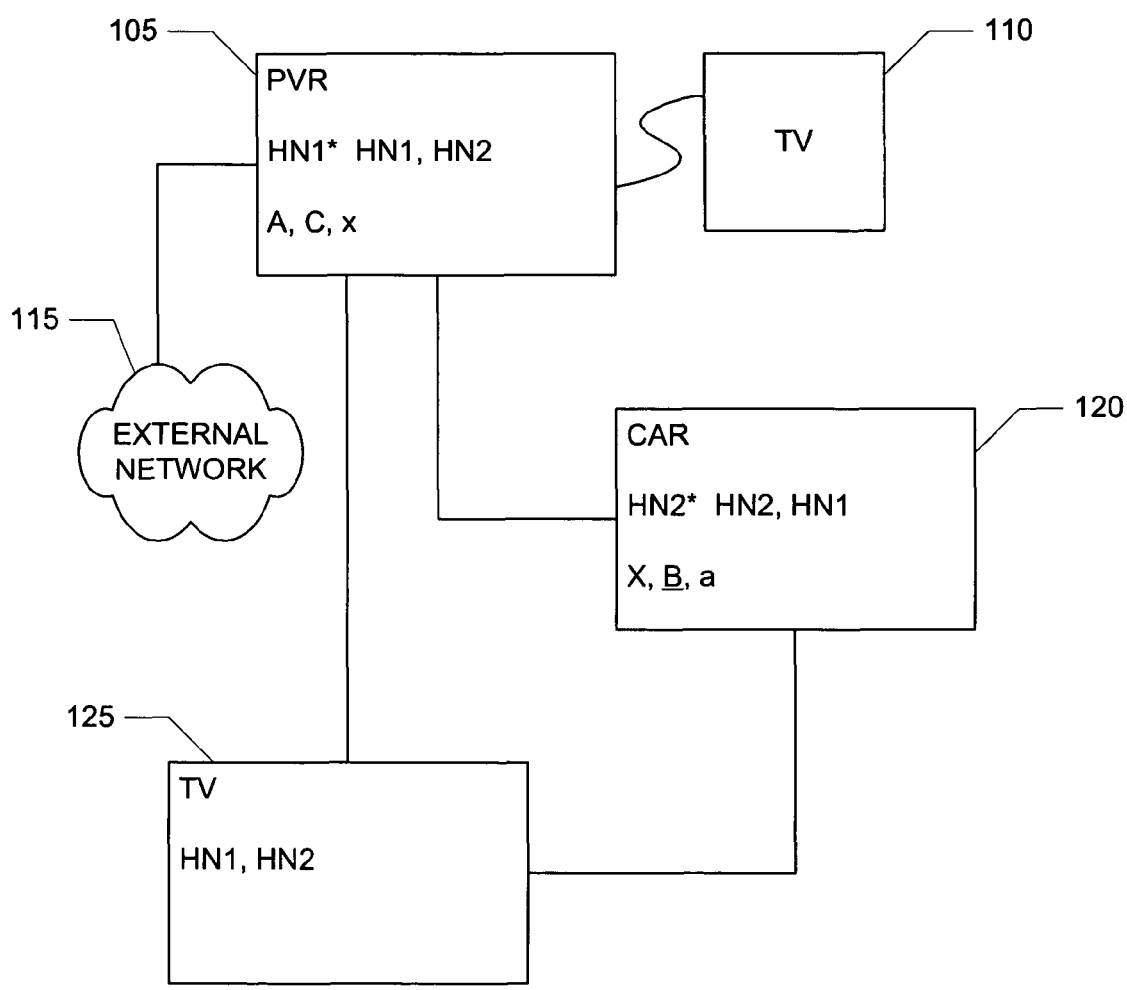

In FIG. 13, Jim decides to unbind the movie B from the hub network HN1 to give the movie B to a friend Sally. Jim requests that the car 120 create a discrete instance of the movie. The PVR 105 has the source version B and so the car 120 passes the request to the PVR 105. The PVR 105 disables the bound instance of the movie B (indicated by the removal of the label "B" from the PVR 105). The PVR 105 creates a discrete instance including a discrete version $\overline{B}$ of the locked content data and moves the discrete version $\overline{B}$ to the car 120 (indicated by the label "B" added to the car 120).

Figure 14:
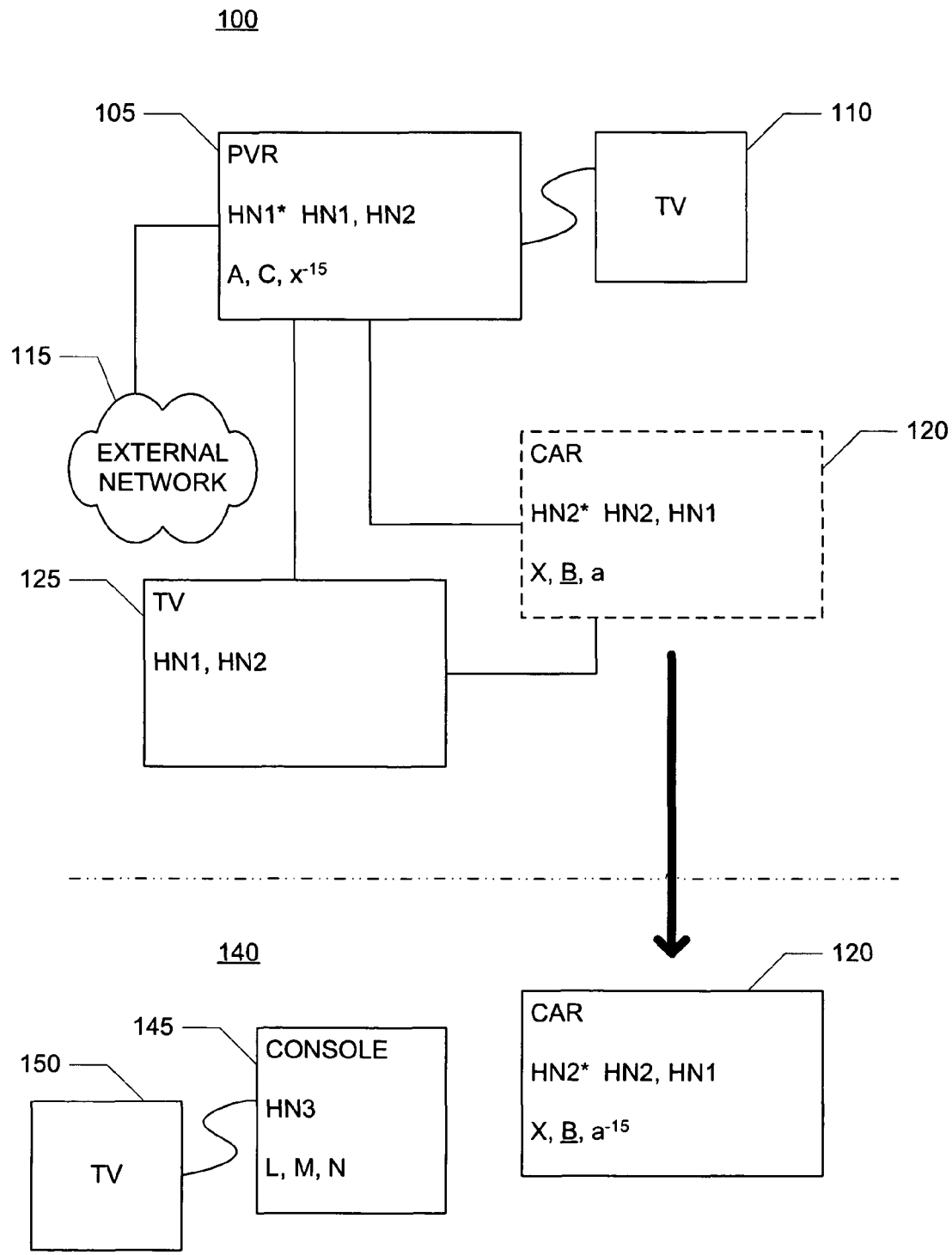

In FIG. 14, Jim drives the car 120 to his friend Sally's home. When Jim drives away from his home, the car 120 leaves the media network environment 100 and enters Sally's media network environment 140. In one implementation, the server device for a hub network monitors the member devices of the hub network and determines when a member device has left the local environment. As discussed above, in this example, the local environment for the PVR 105 and for the car 120 is defined by physical location. When the car 120 leaves, the car 120 leaves the local network environment of the PVR 105, and the car 120 takes the local environment of the car 120 away from the PVR 105 and television 125. As the server of the hub network HN1, the PVR 105 recognizes that the car 120 has left the local environment because the car 120 fails to report its physical location to the PVR 105 or when the car 120 reports a physical location to the PVR 105 that is outside the boundaries of the local environment 100. Similarly, as the server of the hub network HN2, the car 120 recognizes that the PVR 105 and the television 125 have "left" the local environment of the car 120 (i.e., by being left behind).

When the car 120 leaves, the car 120 creates a disconnection in the hub networks HN1 and HN2. As a client in the hub network HN1, the car 120 monitors an expiration period for each of the sub-copy versions received through the hub network HN1. The period is a mechanism in the license for the sub-copy version for controlling how long a sub-copy version can be used without a connection between the client storing the sub-copy version and the server managing the bound instance. When the period expires (e.g., as measured by a secure clock in the client), the disconnected client storing the sub-copy version disables the sub-copy version. In this example, the period is 15 days, (indicated by the "$^{-15}$" superscript in the label "$a^{-15}$" of the car 120). Similarly, as a client in the hub network HN2, the PVR 105 monitors the expiration period for sub-copy versions received through the hub network HN2 (indicated by the "$^{-15}$" superscript in the label "$x^{-15}$" of the PVR 105).

In Sally's media network environment 140, Sally has a game console 145 and a connected television 150. The game console 145 is a compliant device and is both a server device and a client device. The television 150 is not a compliant device, and serves as a terminal device for presenting content from the game console 145. The game console 145 defines a hub network HN3 and acts as the server for the hub network HN3 (indicated by the label "HN3*" on game console 145) and as a client in the hub network HN3 (indicated by the label "HN3" on game console 145). As a server for a hub network, the game console 145 defines a local environment (not shown). Movies L and M and song N are bound to the hub network HN3, and the game console 145 stores source versions of the movies L and M (indicated by labels "L" and "M" on game console 145) and a source version of the song N (indicated by label "N" on game console 145).

In FIG. 15, the next day, Jim connects the car 120 to Sally's game console 145 and gives the discrete instance of the movie B to Sally. Jim and Sally do not cause the car 120 to join the hub network HN3 as a member or cause the game console 145 to join the hub network HN2 as a member. To give the discrete instance of the movie B to Sally, Jim causes the car 120 to move the discrete version from the car 120 to the game console (indicated by the removal of the label "B" from the car 120). Sally causes the game console 145 to bind the discrete instance of the movie $\overline{B}$ to the hub network HN3. The game console 145 disables the discrete instance of the movie B and creates a bound instance of the movie B, storing a source version and root license in the storage of the game console 145 (indicated by the label "B" added to the game console 145).

Because it is the next day, and the car 120 has not reconnected to the hub networks HN1 or HN2, the clocks of the car 120 and the PVR 105 are one day closer to the end of the expiration periods for the sub-copy versions a and x and so one day less remains before the periods expire (indicated by the labels changing to "$a^{-14}$" on the car 120 and "$x^{-14}$" on the PVR 105).

Figure 16:
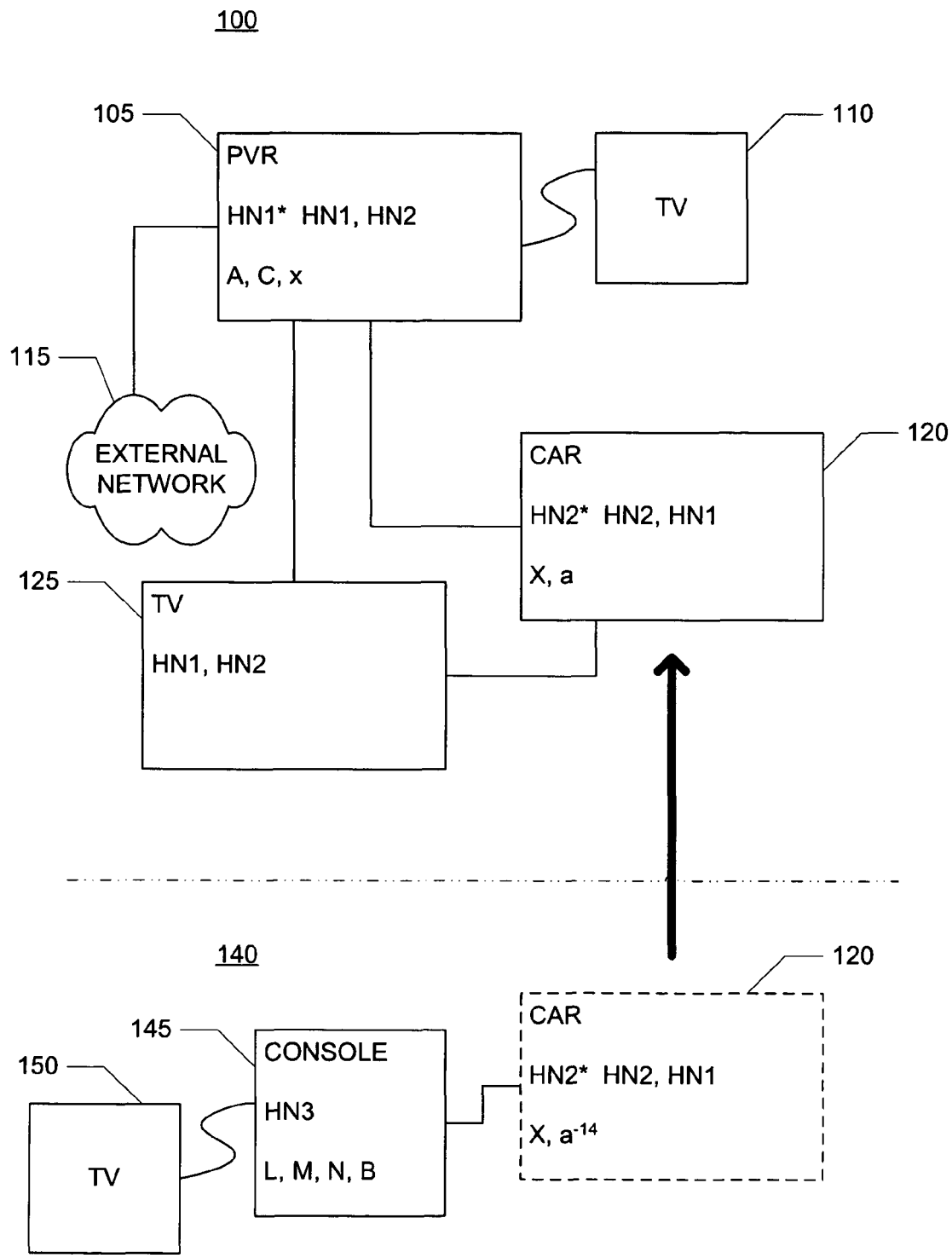

In FIG. 16, Jim returns home in his car 120. When the car 120 leaves, the car 120 disconnects from the game console 145. When the car 120 enters Jim's media network environment 100, the car 120 connects to the PVR 105 and the television 125. The car 120 has returned to the local environment of the PVR 105 and brought back the local environment of the car 120 to the PVR 105 and the television 125. When the car 120 reconnects to the PVR 105, the PVR 105, as the server for the hub network HN1, resets the expiration period for the sub-copy version a of the movie A stored on the car 120 (indicated by changing the label "$a^{-14}$" to "a" on the car 120). Similarly, the car 120, as the server for the hub network HN2, resets the expiration period for the sub-copy version x of the movie X stored on the PVR 105 (indicated by changing the label "$x^{-14}$" to "x" on the PVR 105).

In this example, Jim was able to obtain instances of content and bind the instances in the hub networks of his home media network environment. Jim was able to present the content and make copies within the media network environment. When Jim freed instances of content from the media network environment, the instances were removed. In this way, Jim was able to use his content throughout the media network environment while the instances of content were bound in the media network environment, and then remove the instances of content when he wanted the content to leave the media network environment.

Configuration and Operation of Media Network Environments

FIGS. 17-33 illustrate the configuration and operation of hub networks in a media network environment.

Network Configuration

A media network environment includes one or more hub networks, each hub network having a respective local environment, some or all of which may overlap or be coextensive. The local environment is defined as a limited area such that a compliant device can determine whether the device is in or out of the local environment. For example, one local environment can be defined in terms of physical location (e.g., by calculating the round trip time for packets to travel from server to client, or using geographical positioning data from a GPS system integral to the device), while another local environment is defined in terms of network addressing information (e.g., using IP address and/or subnet information) or logical area (e.g., evaluating network configuration using the number of gateways or routers traversed by a packet). A local environment is defined in terms relative to the server of the hub network (e.g., a 100 meter radius circle with the server at the center). As the conditions of the server change (e.g., the server moves), the local environment may also change. As discussed below, a compliant device can join a hub network while in the local environment of the hub network, and when the device leaves the local environment, the device is disconnected from the hub network (though the device may still be a member). If a device can still maintain a network connection (e.g., a wireless connection) even after leaving the local environment, the device is still treated as disconnected while outside the local environment.

A media network environment includes one or more devices. In one implementation, a device is a self-contained software application, hardware component, or a combination thereof. For example, one computer system can include multiple hardware and/or software devices. Each device in a media network environment is either a media network compliant device (a compliant device) or is not (a non-compliant device). A compliant device operates according to the rules defined for a media network environment and a hub network. A compliant device can be a member of a hub network, such as a server or a client device. A non-compliant device, such as a terminal device, cannot be a member of a hub network in a media network environment. A non-compliant device can interact with a hub network, such as receiving content as output data from a hub network member device, as described below. However, a non-compliant device cannot decrypt and render a compliant copy of content.

A hub network includes one or more member devices. Each member device in a hub network is a server, a client, or both. For example, a member device can include server and client functionality in the same physical system. Each hub network has one server. Each client is connected to the server, directly or through networked connections. In this way, a hub network follows a hub and spoke or star topology with the server at the center. Multiple server devices can be members in the same hub network, with one server device acting as the server for the hub network and the additional server devices acting as clients of the hub network's server (through their client functionality).

The server for a hub network is the focal point of the hub network and manages many aspects of the control of the hub network. A server manages root responsibility for bound instances of content and provides the content to client members in the hub network. A server stores the source version of the locked content data and the corresponding root license of a bound instance. A server provides a sub-copy version of locked content data for a bound instance to a client or streams data of a source version of locked content data to a client. A server manages instances, handles licensing, administers network membership, monitors connection and disconnection of devices to the hub network, and performs time administration. A server defines the local environment of the hub network. As discussed below, a server binds instances of content to a hub network by shifting the state of an instance from discrete (external to the hub network) to bound (internal to the hub network), and a server frees instances from a hub network by shifting the state of an instance from bound to discrete.

The clients in a hub network play or present content data from instances of content (e.g., by decrypting and rendering content data stored in a version of the locked data of an instance). A client device receives a sub-copy version of locked content data and a sub-copy license for a bound instance from the server or receives streamed data from the server. A client device includes storage for storing sub-copy versions (a storage client device) or does not store sub-copy versions (a non-storage client device). A client device presents content data directly through integrated components or through a connected terminal device. In another implementation, a client device can also stream content data from a sub-copy version to another client device that is a member of the same hub network.

A terminal device is for presentation of content and is not a member of a hub network. A terminal device is connected to a member device and receives data for presentation, such as output video and audio data. A terminal device may provide other functions as well for services apart from the media network environment.

When a media network environment includes two or more hub networks, some or all of the hub networks may overlap. Two hub networks overlap when both of the hub networks include the same device or devices. A device belonging to two hub networks spans the hub networks and is a spanning device. A spanning device stores (or can store) content data for instances bound to each of the hub networks. Accordingly, the spanning device can present content bound to multiple respective hub networks (a bound instance is bound to only one hub network). In one implementation, however, a spanning device spans multiple hub networks only in the same local environment. In this case, if a device becomes a member of hub networks in different local environments, the device will only present content from the hub network to which the device has been most recently connected. In another implementation, a spanning device may span hub networks in different local environments and play content from any of the spanning device's hub networks (subject to license requirements, such as refreshing, as discussed below).

The overlapping hub networks provide a flexible environment for managing the use and copying of content. Each server manages the devices and content in the server's hub network and each client operates in compliance with the rules of the hub network. As a result, a user can present, move, and copy content data through the media network environment in a convenient manner and at the same time the presentation, copying, and moving of the content data is controlled to reflect the licensing guidelines set for a licensing authority (e.g., by the content owner). In addition, the management of each hub network is grounded in the server of the hub network.

Figure 17:
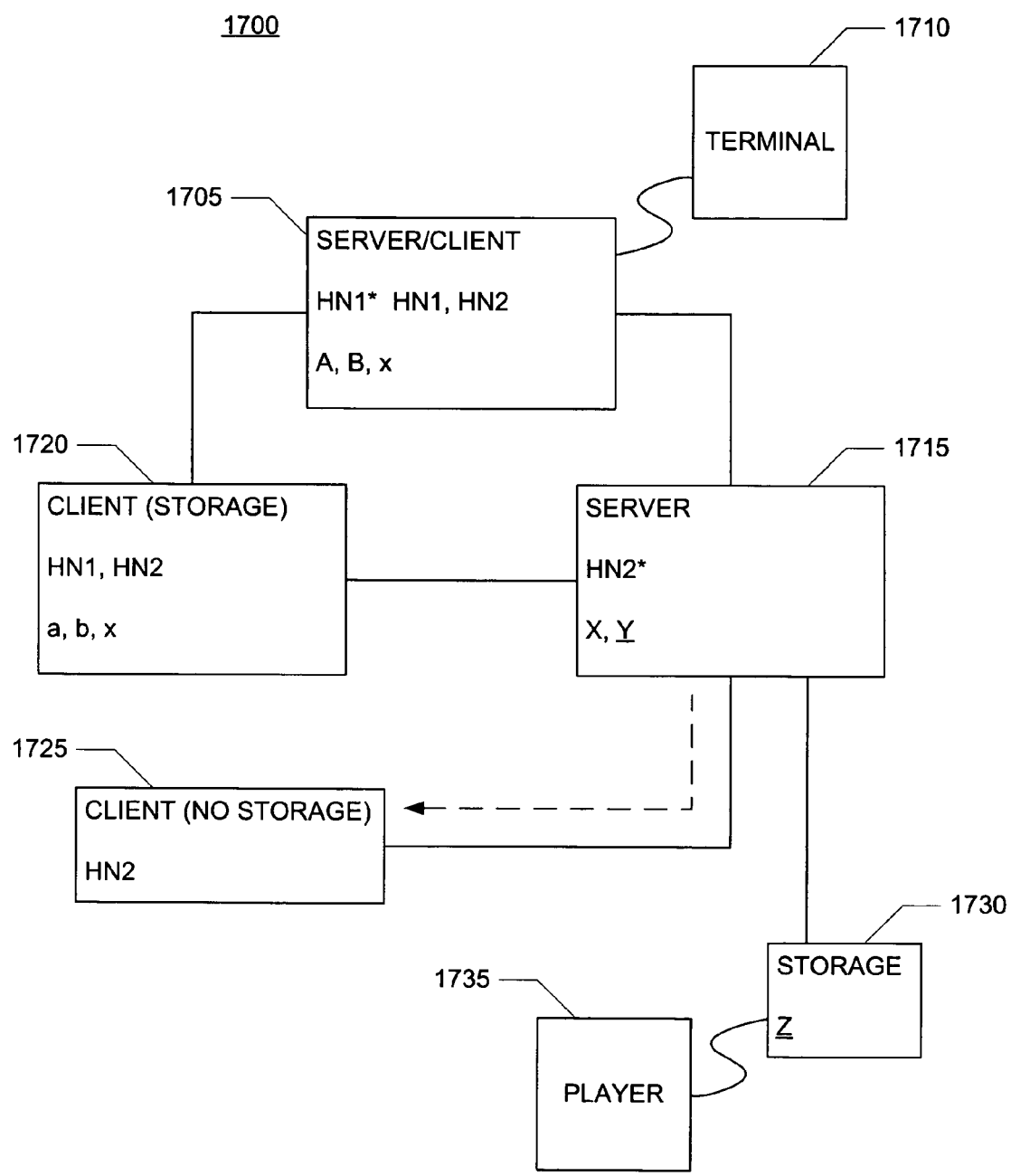
FIG. 17 shows a representation of one implementation of a media network environment.

FIG. 17 shows a representation of one implementation of a media network environment 1700. The media network environment includes two overlapping hub networks HN1 and HN2, with two respective and substantially coextensive local environments (not shown).

The media network environment 1700 includes several devices: a server/client device 1705 connected to a terminal device 1710, a server device 1715, a storage client device 1720, a non-storage client device 1725, a storage device 1730, and a player device 1735. The server/client device 1705, the server device 1715, the storage client device 1720, the non-storage client device 1725, and the storage device 1730 are compliant devices. The terminal device 1710 and the player device 1735 are non-compliant devices.

The server/client device 1705 and the server device 1715 are servers for respective hub networks. The server/client device 1705 acts as both a server and a client. The server device 1715 acts as a server, but not as a client (e.g., does not decrypt and render content).

The terminal device 1710 is for presentation of content data from a connected device, such as a television. The terminal device 1710 does not store content data bound to the hub network.

The storage client device 1720 and the non-storage client device 1725 are client devices. As client devices, the storage client device 1720 and the non-storage client device 1725 present content data through integrated media components (e.g., audio and video outputs). As noted above, the server/client device 1705 is also a client device but presents content data through the connected terminal device 1710. The storage client device 1720 includes storage for storing sub-copy versions of content data. The storage client 1720 presents content data for sub-copy versions stored in the storage client 1720 or content data received as streaming data from a server (e.g., the server/client device 1705). The non-storage client 1725 does not store sub-copy versions of content data to present. The non-storage client 1725 presents content data received as streaming data from a server (e.g., the server device 1715). In another implementation, all client devices are non-storage clients devices. In this case, if a device has storage for bound content data, the device is a server or server/client device.

The server/client device 1705 is the server for a hub network HN1, indicated by the "HN1*" label on the server/client 1705. The server/client device 1705 and the storage client device 1720 are clients in the hub network HN1, indicated by the "HN1" label. The terminal device 1710 is connected to the server/client device 1705 for presenting content data from the server/client device 1705. The terminal device 1710 is not a member of the hub network HN1. The server device 1715 is the server for a hub network HN2, indicated by the "HN2*" label on the server device 1715. The server/client device 1705, the storage client device 1720, and the non-storage client device 1725 are clients in the hub network HN2, indicated the by the "HN2" label. The non-storage client device 1725 does not store sub-copy versions of content data, but instead receives streamed data from the server device 1715, indicated by the dashed line from the server device 1715 to the non-storage client device 1725.

The two hub networks HN1 and HN2 are overlapping, defining an overlapping or overlaying hub and spoke architecture. The hub network HN1 includes the server/client device 1705 and the storage client device 1720. The hub network HN2 includes the server/client device 1705, the server device 1715, the storage client device 1720, and the non-storage client device 1725. The server/client device 1705 and the storage client device 1720 are members of both hub networks HN1 and HN2 and so are spanning devices.

The storage device 1730 is a compliant media device and the connected player device 1735 is a non-compliant device. The storage device 1730 and the player device 1735 are not members of the hub networks HN1 and HN2. The storage device 1730 is a portable storage device including compliant media, such as a compliant flash memory card. The player device 1735 is a portable media player device, such as an MP3 player. In other environments, non-compliant devices that are not portable can be connected to one or more compliant devices.

The storage device 1730 is connected to the server device 1715 (e.g., is inserted into a port) and so can exchange data with the server device 1715. Accordingly, the storage device 1730 and the server device 1715 can exchange discrete instances. The storage device 1730 is connected to the player device 1735 and the player device 1735 can present non-compliant copies of content data stored in the storage device 1730. Because the player device 1735 is a non-compliant device, the player device 1735 cannot play or present compliant content data stored on the storage device 1730. The storage device 1730 cannot make usable copies from discrete instances stored on the storage device 1730.

Hub Network Membership

A server manages the membership of devices in the hub network. The server adds and removes clients as members of the hub network. A server will only grant licenses to member devices. Upon approval by a user, the server adds a client device as a member after verifying that the client device is a compliant device. If the server is also a client device, the server initially adds itself as a client automatically. In one implementation, the server is also considered a member. In another implementation, only clients are members. Once added as a member, a device is a member until the server removes the device as a member. The server removes a client device as a member upon request by a user or when conditions are met for revoking the membership.

Figure 18:
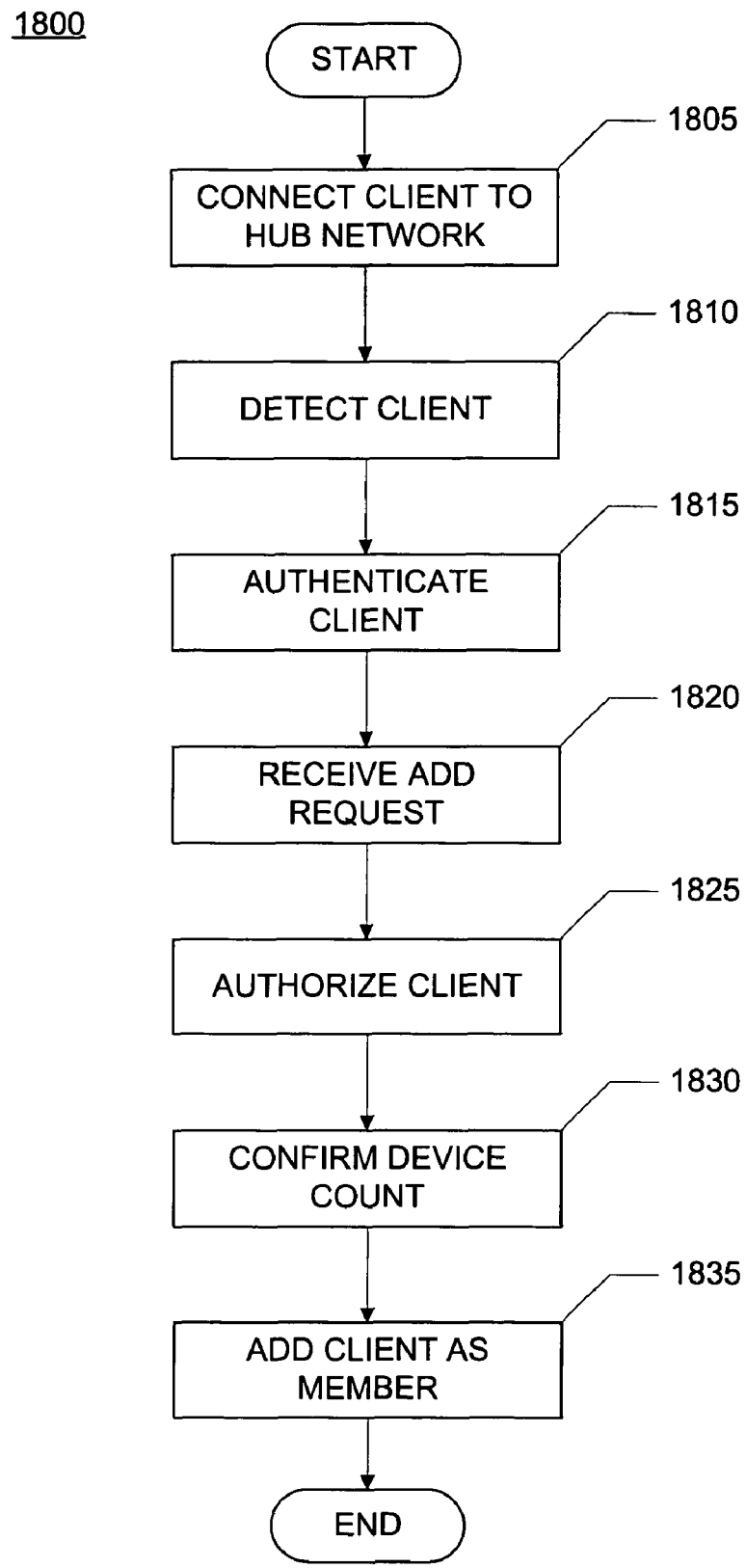
FIG. 18 shows a flowchart of one implementation of adding a device to a hub network as a member device.

FIG. 18 shows a flowchart 1800 of one implementation of adding a device to a hub network as a member device, such as adding storage client 1720 to the hub network HN1 in FIG. 17. Initially, a client device is connected to a hub network, block 1805. The client can be connected directly to the server, through a wired or wireless connection, or can be connected indirectly to the server, such as through intervening network devices. The server will not add an unconnected device as a member (though see an alternative implementation described below using an intermediary device to add an unconnected device).

The server detects the connected client device, block 1810. A compliant device sends a message or connection notification to devices on the hub network indicating that the device is now connected to the hub network. In another implementation, the server periodically polls connected devices for new clients.

The server authenticates the detected client device, block 1815. The server sends a compliance confirmation request for information from the client device to establish whether the client device is a compliant device or not. For example, the server sends a confirmation request encrypted for a compliant device. If the client device does not respond properly or the server otherwise determines that the client device is not a compliant device, the authentication fails and the server will not add the client device as a member to the hub network.

After confirming that the client device is a compliant device, the server sends an identification request for information from the client device identifying the client device. The server has a minimum set of identifying information required to authenticate the client device, such as a MAC address (Media Access Control address). In one implementation, a compliant device has a secure and unique device identifier for hub networks. If the client device does not respond or does not provide appropriate information, the authentication fails and the server will not add the client device as a member to the hub network. If the server authenticates the client device, the server checks a list of member devices to see if the authenticated client device is already in the list of member devices. If so, the server does not need to add the client device as a member and informs the user that the device has reconnected. The server and client proceed as discussed below referring to FIG. 21 (discussing reconnection of a member device). In one implementation, the server adds the authenticated client device to a list of authenticated connected devices for the server's hub network.

After successfully authenticating the client device, the server receives an add request to add the client device from a user, block 1820. The server waits to proceed with adding a client device until the server receives an affirmative request from a user to add a specific client device. In another implementation, the server requests approval or confirmation from the user to add an authenticated device when the device is detected instead of waiting for a request from the user. In another implementation, the server waits to authenticate the client device until after receiving a request or approval to add the client.

After receiving a request to add the client device, the server authorizes the client device, block 1825. In one implementation, the client must be in the local environment of the hub network to be added. The server sends a local environment confirmation request for information from the client to establish whether the client device is in the local environment of the hub network. In one implementation, the server sends a test message and waits for a response from the client (e.g., pings the client). Based on the amount of time between sending the test message and receiving the response, the server determines whether the client is in the local environment (e.g., a round trip time below a threshold indicates a client is within the local environment). In another implementation, the server sends local environment information to the client device and the client device determines whether the client device is in the local environment or not. If the server does not establish that the client device is in the local environment of the hub network, the authorization fails and the server will not add the client device as a member to the hub network.

In one implementation, the server also confirms that the client device is not on the server's revocation list before authorizing the client device. As described below, the revocation list indicates devices for which authorization has been revoked. In one implementation, the server adds the authorized client device to a list of authorized devices.

After successfully authorizing the client device, the server confirms that the number of member devices in the hub network is below the member device limit, block 1830. The server stores a device limit indicating the maximum number of member devices that the server will add as members to the hub network, such as 20. The server also maintains a device count, incremented for each device added as a member. If the device count has already met the device limit, the server will not add the client device to the hub network as a member. In an alternative implementation, the server does not maintain a device count or a device limit, and block 1830 is skipped. In another implementation, the device limit can be modified by request from a verified external authority.

If the device count is below the device limit, the server adds the client device as a member and a client of the hub network, block 1835. The server sends an add confirmation message to the added client. The server also increments the device count by one. In one implementation, the server adds the client device to a list of members and a list of clients (or the same list). Some or all of the lists of connected devices, authenticated devices, authorized devices, member devices, client devices, and revoked devices can be integrated or related (e.g., cross-indexed), or omitted.

In an alternative implementation, a server automatically attempts to add detected client devices upon detection, or uses a set of rules to determine when to attempt to add connected client devices. In another implementation, the server automatically attempts to authenticate and authorize detected client devices, but does not add an authenticated and authorized device as a member until after receiving a user request or approval.

In another implementation, when the device count has reached the device limit and the server is attempting to add another device, the server contacts a device registration server, such as through an external network connection. The device registration server indicates whether the client device is to be added to the hub network or not. The device registration server maintains information for hub networks and their member devices. The device registration server can use various criteria to determine whether to allow the client device to be added or not. In one implementation, the device registration server compares a threshold to how many hub networks to which the client device has already been added as a member. In another implementation, the device registration server compares the number of devices already added to the hub network to a second device limit, allowing the client device to be added if the device count is below the second device limit. In this case, the first device limit stored by the server acts as a limit for adding devices without external registration and the second device limit acts as a maximum for adding devices. In another implementation, the server always checks with the device registration server before adding a device (e.g., as though the first device limit were zero).

In another implementation, an unconnected device or a device outside the local environment can be added as a member. In this case, an intermediary device acts as a "conduit" for membership. The server and the potential member client are either not connected or the client is not in the local environment of the server. The intermediary device is connected to both the server and client (e.g., directly, indirectly, or at different times such as when the intermediary device is a portable device moving between the server and client). The intermediary device requests permission from the server of a hub network to add the client to the hub network. The addition process works similarly to that described above, but instead of the server and client communicating directly, the intermediary device passes messages between the server and client, with communication to each respective device occurring in the local environment relative to that device.

Figure 19:
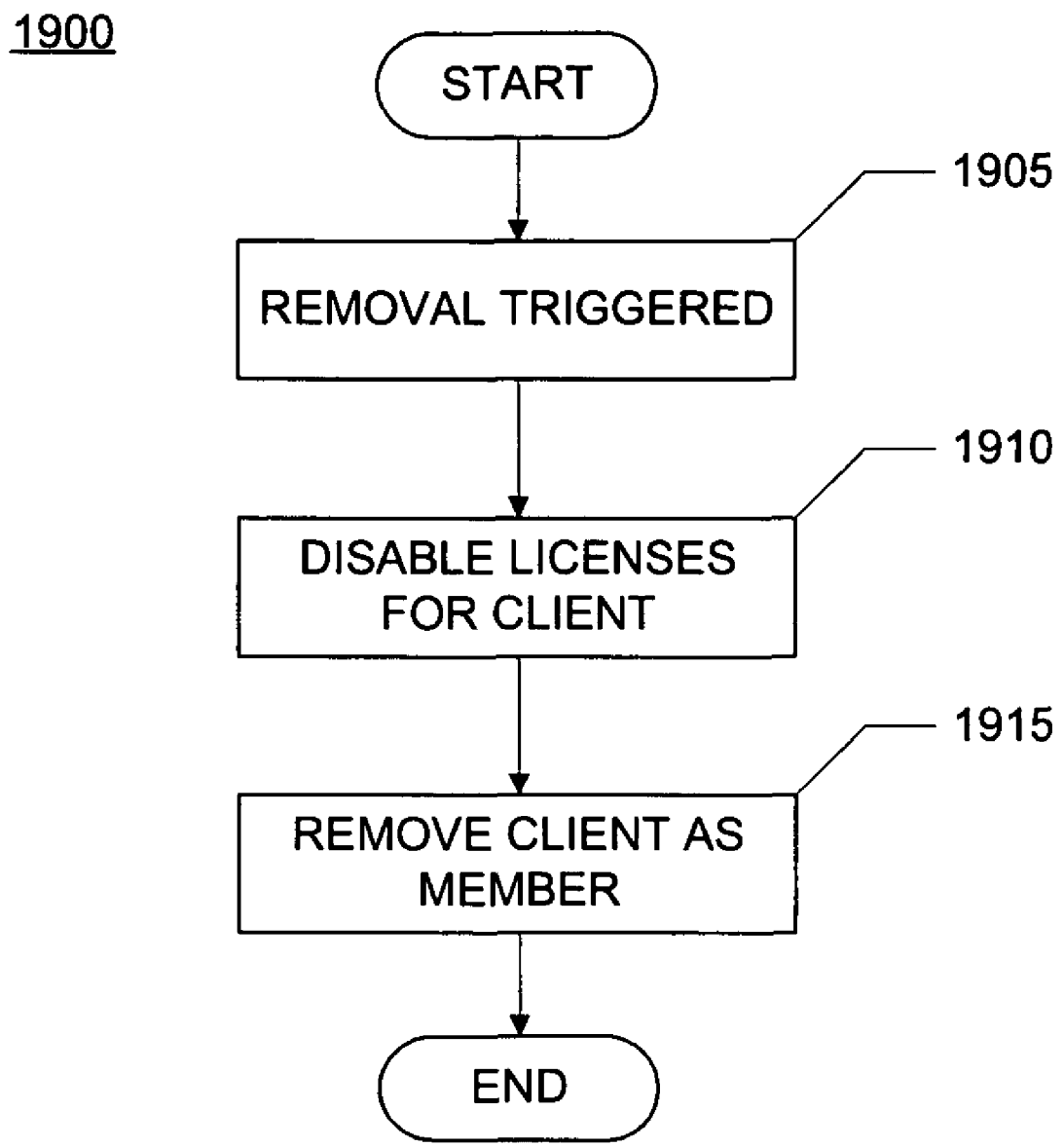
FIG. 19 shows a flowchart of one implementation of removing a device from a hub network as a member device.

FIG. 19 shows a flowchart 1900 of one implementation of removing a device from a hub network as a member device, such as removing storage client 1720 from the hub network HN1 in FIG. 17. Initially, the device is connected to the hub network and is a member of the hub network. The removal of a member client device is triggered, block 1905. In one implementation, removal is triggered in two ways: by receiving a removal request from the user specifying the client device, or by the server determining that the authorization of the client device is to be revoked. The server determines that the client device is to be revoked when the server receives a revocation notification identifying the client or determines that the client device has circumvented or broken the rules of the hub network for compliant member devices, such as failing to disable a sub-copy version when the state of the bound instance is changed to discrete. The server also revokes the authorization for a device when the server determines that the security of the device has been compromised.

The server disables the licenses for sub-copy versions of bound instances bound to the server's hub network for the client device to be removed, block 1910. The server sends a disable request to the client indicating the sub-copy versions to be disabled and the client disables the corresponding licenses. In addition, the removed client device will not be able to receive a new license or be able to refresh an existing license for a bound instance bound to the hub network from which the client device was removed. In one implementation, a compliant client device automatically disables all licenses for sub-copy versions stored on the client and for bound instances bound to the hub network from which the client has been removed once the client has been removed. Removing a client from one hub network does not necessarily disable licenses for sub-copy versions for bound instances bound to another hub network.

The server removes the client device as a member of the hub network, block 1915. The server removes the client device from the list of member devices and decrements the member device count. A server maintains a revocation list of devices for which membership has been revoked. When a server removes a device for revocation, the server adds the device to the server's revocation list. A server will not add a client device as a member if the client device is included in the revocation list. In one implementation, a server publishes a revocation list to other devices when the revocation list is updated, such as to clients in the hub network, other servers, or a central database. In another implementation, the server updates one or more root licenses stored on the server to indicate that the client has been revoked.

In one implementation, a server does not remove a disconnected client as a member until all of the licenses for sub-copies stored on the client have expired. As described below, when a device is disconnected, licenses from the disconnected hub network will eventually expire. The server waits to complete the removal of the disconnected device until all of those licenses have expired.

Device Disconnection and Reconnection

When a device enters the local environment of a hub network, the device can connect to the hub network. When a device leaves the local environment of a hub network, the device is disconnected from the hub network. When a device returns to the local environment, the device can reconnect to the hub network. As discussed above, when a compliant non-member is connected or reconnected to the hub network, the server proceeds to attempt to add the new device after receiving a request or approval from a user.

Figure 20:
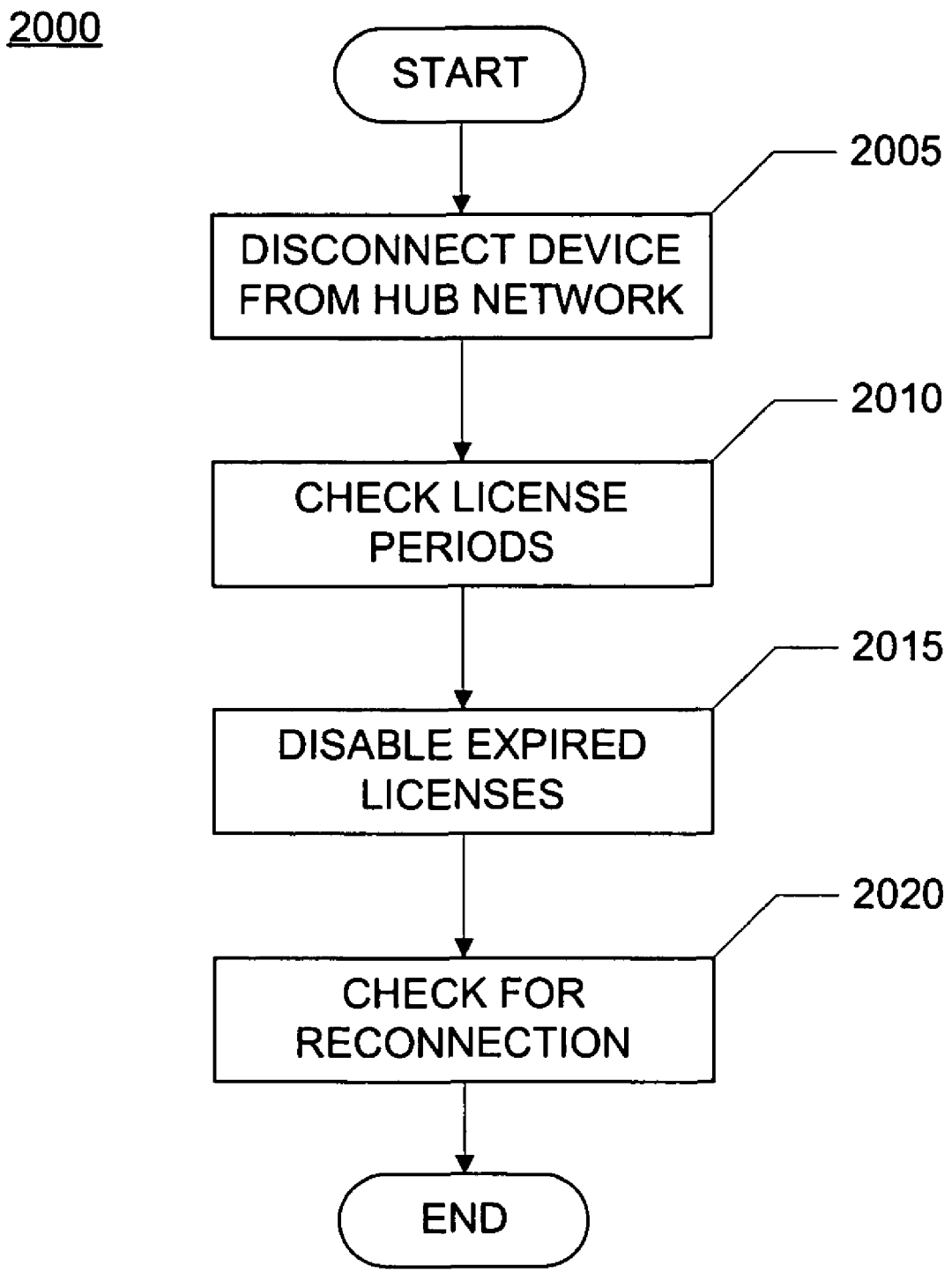
FIG. 20 shows a flowchart of one implementation of disconnecting a member device from a hub network.

FIG. 20 shows a flowchart 2000 of one implementation of disconnecting a member device from a hub network. Initially, a connected device becomes disconnected, block 2005. A device can be disconnected in various ways. When a device leaves the local environment of a hub network, the device is disconnected from the hub network. When the physical connection (wireless or wired) between the device the hub network fails, the device is disconnected. For example, when the server and client can no longer exchange packets of data, the client and server are disconnected. In one implementation, the server determines whether a client is connected or not as needed (e.g., before acting based on the client being connected). In another implementation, the server periodically polls clients for connection and maintains a connected device list, and the client also periodically polls the server and recognizes when the client is disconnected. In another implementation, when a user affirmatively requests that a device be disconnected, the device is disconnected.

Because the local environment is defined relative to the position of the server (e.g., within 100 meters of the server), the server will not leave the local environment because the server takes the local environment with the server when the server physically moves. However, when the server moves, one or more clients of the hub network may not move and so may "leave" the local environment of the hub network as a result of the server's movement. In this case, the clients left behind are disconnected from the hub network as being outside the local environment.

The client checks the expiration period for any licenses of sub-copy versions of bound instances bound to the hub network, block 2010. As discussed below, the license for a sub-copy version includes an expiration period. When the client receives the license, the client sets an expiration time based on the expiration period of the license. For example, for a license with an expiration period of 15 days, the client sets the expiration time to be 15 days from the time when the client received the license. The client monitors how much time remains until the expiration time and when the expiration time has been reached using a secure clock. A client periodically refreshes the license by requesting a refreshed license from the server and resets the expiration period and time when the refreshed license is received. A disconnected client device cannot refresh the license because the client is not connected to the server. While the client is unable to refresh the license, the expiration time does not change and so the amount of time until the expiration time is reached continues to decrease. When the expiration time is reached, the expiration period has expired and the client disables the license. When the client can refresh the license again, the client enables the license and resets the expiration time. A client may be unable to refresh one license because the client is disconnected from the hub network for the license, but be able to refresh a second license because the client is still connected to a different hub network corresponding to the second license.

If any of the expiration periods have expired, the client disables the licenses with the expired periods, block 2015. The client disables the license, disabling the corresponding sub-copy version. In another implementation, the client disables the sub-copy version in another way, as described below.

The client periodically checks to see if the client has been reconnected to the hub network, block 2020. In one implementation, the client checks for reconnection at the same time as requesting a refreshed license. In some configurations, such as for one implementation using a wired connection, the client does not need to periodically check for reconnection because the client quickly receives a signal indicating the reconnection, and so block 2020 may be skipped. When the client is reconnected to the hub network, the client follows the process shown in FIG. 21.

Figure 21:
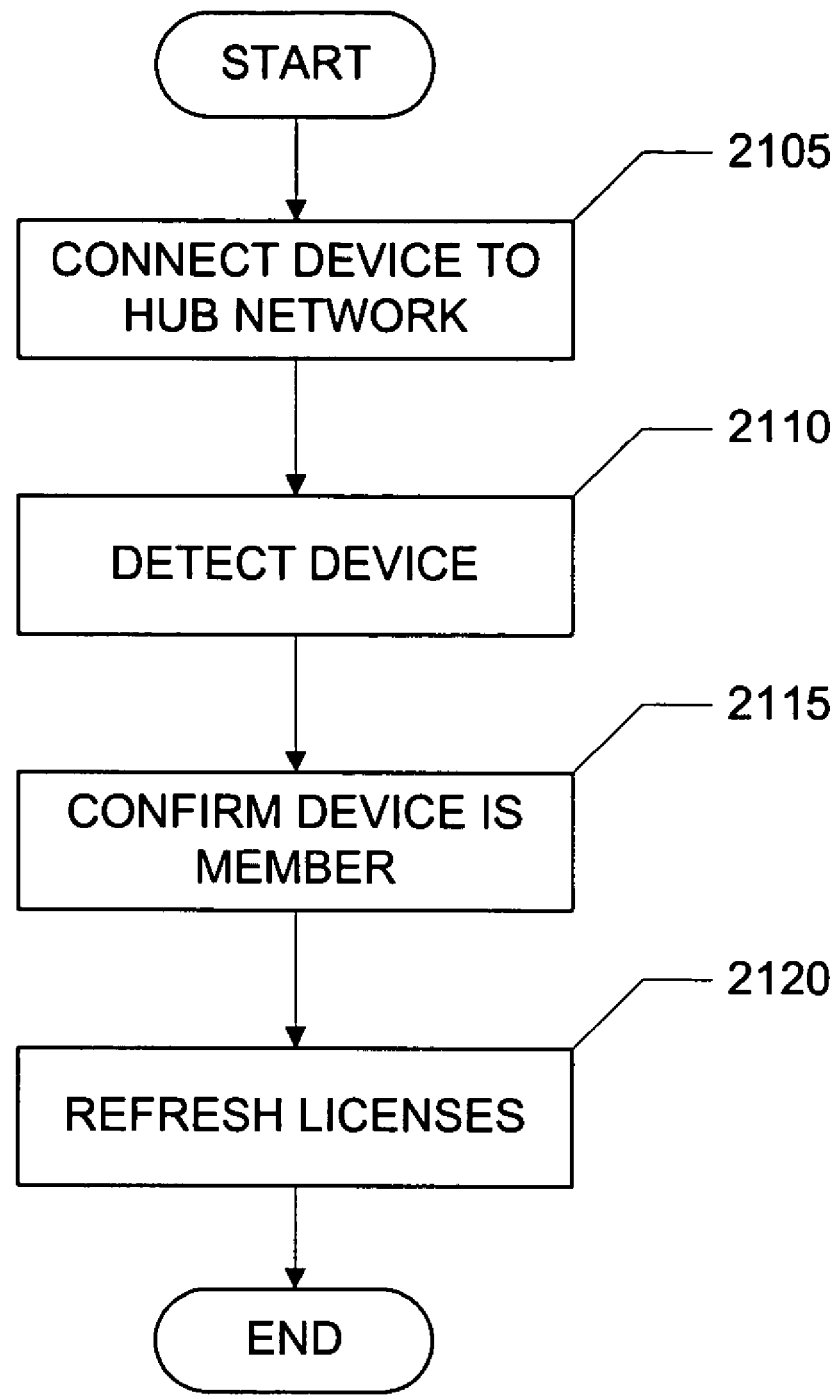
FIG. 21 shows a flowchart of one implementation of reconnecting a member device to a hub network.

FIG. 21 shows a flowchart 2100 of one implementation of reconnecting a member device to a hub network. Initially, the device is a member device that has been disconnected from a hub network. The device is then reconnected to the hub network, block 2105. A device can be reconnected when the device is in the local environment of the hub network and the physical connection between the device the hub network is restored or established. In one implementation, the client periodically polls the server and recognizes when the client is reconnected. In one implementation, a device does not reconnect until requested to do so by a user.

The server detects the reconnected device in the hub network, block 2110. In one implementation, the client sends a reconnection notification to the server. As discussed above referring to block 1810 of FIG. 18, in another implementation, the server periodically polls the hub network for newly connected or reconnected devices.

The server authenticates the detected device and checks if the reconnected device is a member client of the hub network, block 2115. As discussed above referring to block 1815 of FIG. 18, the server authenticates a device on connection to determine the identity of the device. The server maintains a list of member devices and so can recognize that a newly connected device is already a member of the hub network and does not need to be added again. In one implementation, the server confirms that the reconnected device is in the local environment of the hub network. In one implementation, the server also confirms that the reconnected device is not on a revocation list.

After authenticating the device as a member device, the server refreshes licenses of the client, block 2120. The server refreshes the licenses of sub-copy versions of content data stored on the client for bound instances bound to the server's hub network. The server does not refresh licenses for sub-copy versions for bound instances bound to other hub networks. Alternatively, the client requests that the licenses be refreshed once the client has successfully reconnected to the hub network.

Time Administration

A server manages time administration for the hub network. Time administration includes relative time and absolute time management. The server manages time to enforce time-based limitations, such as in licenses for discrete or bound instances of content in the hub network. Clients also manage time internally, or with reference to the time administration of the server. When a client receives a license for a sub-copy version from a licensing authority, the client synchronizes time information with the licensing authority before receiving the license. Servers and clients use secure mechanisms for managing time.

Security

In one implementation, the devices of a hub network use secure techniques for various operations, including, but not limited to: communicating data; placing requests; logging transactions for transaction history; providing and disabling licenses; authenticating, authorizing, disabling, and revoking devices; storing, making, and moving instances, copies and keys; maintaining metadata for instances and copies; and presenting and streaming content. The compliant devices periodically may renew the security processes from a central authority, or receive updates from a user or automated source. A client device renews security mechanisms before receiving a license, including mechanisms such as updating encryption keys, synchronizing the client's clock and time information with the server, exchanging and updating revocation lists, and renewing system security data and tools. In one implementation, a server can revoke a key if the server has determined the key has been compromised. In this case the server requests compliant devices disable the revoked key so that the revoked key will not be used to access secure media content.

Content Management

Devices in a media network environment present, copy, and move the content data for instances of content. As discussed above, an instance includes content data that is media data, such as audio and/or video data. As discussed above, the server for a hub network manages the state of bound instances of content in the hub network. The server directly changes the state of a bound instance and causes member clients in the hub network to take appropriate actions according to these state changes.

An instance of content is either compliant or non-compliant. A compliant instance includes data encoded so that only compliant devices are to be able to decode and present the content data. Accordingly, non-compliant devices cannot present content data from a compliant instance. A compliant device (a server) can bind or free a compliant instance to or from a hub network.

A non-compliant instance or copy of content is not encoded according to the requirements of a hub network and so a non-compliant device or a compliant device can present the content data of a non-compliant instance or copy (subject to other copy control mechanisms that may be present in the instance or copy). A compliant device will not bind a non-compliant instance or copy to a hub network, but can store non-compliant content in alternative forms. In one implementation, if a non-compliant instance has copy control information recognized by the compliant device and authorized to be used in the hub network, the compliant device can bind the non-compliant instance defining the root license according to the copy control information.

Content States

Each compliant instance of content in the hub network is in one of two exclusive states: discrete or bound. A discrete instance of content is not bound to any hub network and can be moved from one device to another, in or out of the hub network, using compliant media. A compliant device will not make a copy of a discrete instance (other than transiently in the course of presenting the content data). The discrete instance can be in various forms, such as one or more electronic files stored on complaint storage media (e.g., an optical disc), or one or more electronic files stored in storage of a compliant device (e.g., received by download through a network connection). Media storing a discrete instance of content is media network compliant media. Compliant media allows a server to modify the discrete instance as needed, such as to disable the discrete instance when binding the content to the hub network. In addition, compliant media is configured so that devices are not to be able to create a bit-by-bit copy of the data of any discrete instances stored on the compliant media. Accordingly, compliant media is or includes secure read/write storage media (e.g., a writable optical disc or read-only media with an attached or associated writable storage). In one implementation, the writable storage is remote from the media itself, such as a database. A compliant device will not create a copy of a discrete instance.

Figure 22:
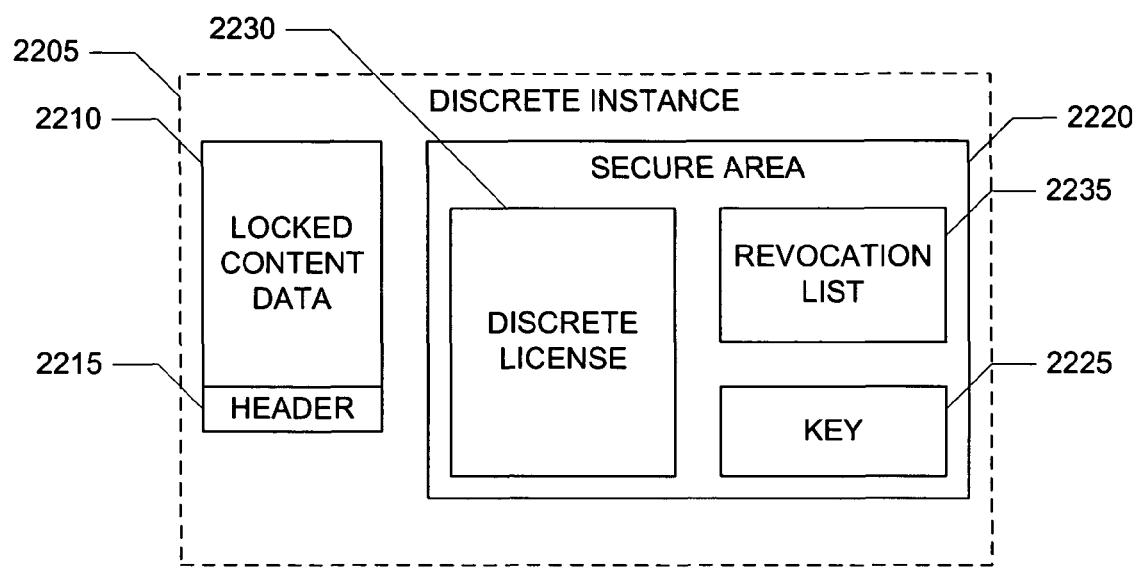
FIG. 22 shows a representation of one implementation of a discrete instance of content.

FIG. 22 shows a representation of one implementation of a discrete instance 2205. The discrete instance 2205 includes locked or secure content data (e.g., encrypted) 2210. The locked content data of a discrete instance is also referred to as the discrete version of the locked content data of the discrete instance. The locked content data 2210 is the media content data of the discrete instance, such as audio or video data (e.g., a song, a television program, a movie). In an alternative implementation, the locked content data is non-media data, such as executable software (e.g., a computer or video game). The locked content data 2210 is encrypted (e.g., using one or more cryptographic algorithms that are published and verified through public peer review). The locked content data 2210 is encrypted using a content encryption technique so that only compliant devices can decrypt the locked content data 2210. Header information 2215 is associated with the locked content data. The header information includes metadata such as a title identifier, an instance identifier (identifying the particular instance), encoding data (e.g., indicating the codec, resolution, and encoding entity used to encode the locked content data), and licensing authority data. The licensing authority data indicates an external licensing authority that can be accessed to obtain additional rights or licenses. Some implementations of discrete instances do not include licensing authority data (e.g., using whatever license is provided along with the locked content data). In another implementation, some or all of the header information 2215 is also encrypted or is included in the locked content data 2210. The discrete instance 2205 includes a secure area 2220 of encrypted data. The data of the secure area 2220 is encrypted using a hub network encryption technique so that only compliant devices are to be able to decrypt the data of the secure area 2220 (e.g., using a key held by compliant devices). The secure area 2220 includes a key 2225, a discrete license 2230, and a revocation list 2235. The key 2225 is for unlocking the locked content data 2210. In one example, a compliant device holds a key for decrypting the secure area 2220 including the key 2225 (which was encrypted using hub network encryption), and uses the key 2225 to decrypt the locked content data 2210 (which was encrypted using content encryption). The discrete license 2230 holds the current license for the locked content data 2210 for the specific discrete instance 2205. The license 2230 defines the set of permissions defined for the locked content data 2210 for the specific discrete instance 2205, including presenting, copying, and moving as appropriate for a discrete instance (e.g., copying is not permitted). The license 2230 also indicates what types of licenses are available for a bound instance based on the discrete instance 2205. In one implementation, the license 2230 includes a flag to indicate that the discrete instance 2205 is a discrete instance. The revocation list 2235 indicates devices for which authorization has been revoked. A compliant device maintains its own revocation list. When a compliant device receives a discrete instance, the device adds to its revocation list any devices in the revocation list of the discrete instance that are not on the device's revocation list. A compliant device will not present or play a discrete instance if that device is listed in the device's revocation list. A compliant server will not bind a discrete instance if that server is listed in the server's revocation list. In another implementation, the discrete instance does not include a revocation list. In another implementation, components of the discrete instance are stored as multiple files.

A bound instance is bound to a particular hub network and managed by the server of that hub network. Data of a bound instance is encrypted (at least in part) so that a non-compliant device or a device outside the bound hub network is not to be able to present or play the content data of the bound instance. The server managing the bound instance has root responsibility for the bound instance. Root responsibility includes issuing and managing the licenses for sub-copy versions of the locked content data of the bound instance. The server managing the bound instance also manages a source version of the locked content data of the bound instance. The server uses the source version for creating sub-copy versions of the locked content data in the hub network. The designated server is a local licensing authority for the sub-copy versions of that bound instance. The server can make sub-copy versions from the source version and provide the sub-copy versions to clients in the hub network. In one implementation, clients can also make sub-copy versions from the sub-copy versions stored by the clients, but the clients receiving the new sub-copy versions will need licenses from the server of the hub network to present the content. A client device can move a sub-copy version to another device in the hub network or to a device outside the hub network. A device receiving a sub-copy version from a different hub network (e.g., of which the device is not a member) needs to obtain a new license, such as from a licensing authority indicated by the sub-copy version. A compliant server will not move the root responsibility, and thus the bound instance, to another compliant server without first changing the state of the bound instance back to discrete. To transfer root responsibility to another server, the server shifts the bound instance to a discrete instance and moves the discrete instance to the second server. The second server then shifts the received discrete instance to a bound instance, and so the second server then has root responsibility. In this case, the bound instance is then bound to a different hub network, that of the second server. In another implementation, the source version is not stored on the server for the hub network, but the server stores and administers the root license and remotely manages the source version.

Figure 23:
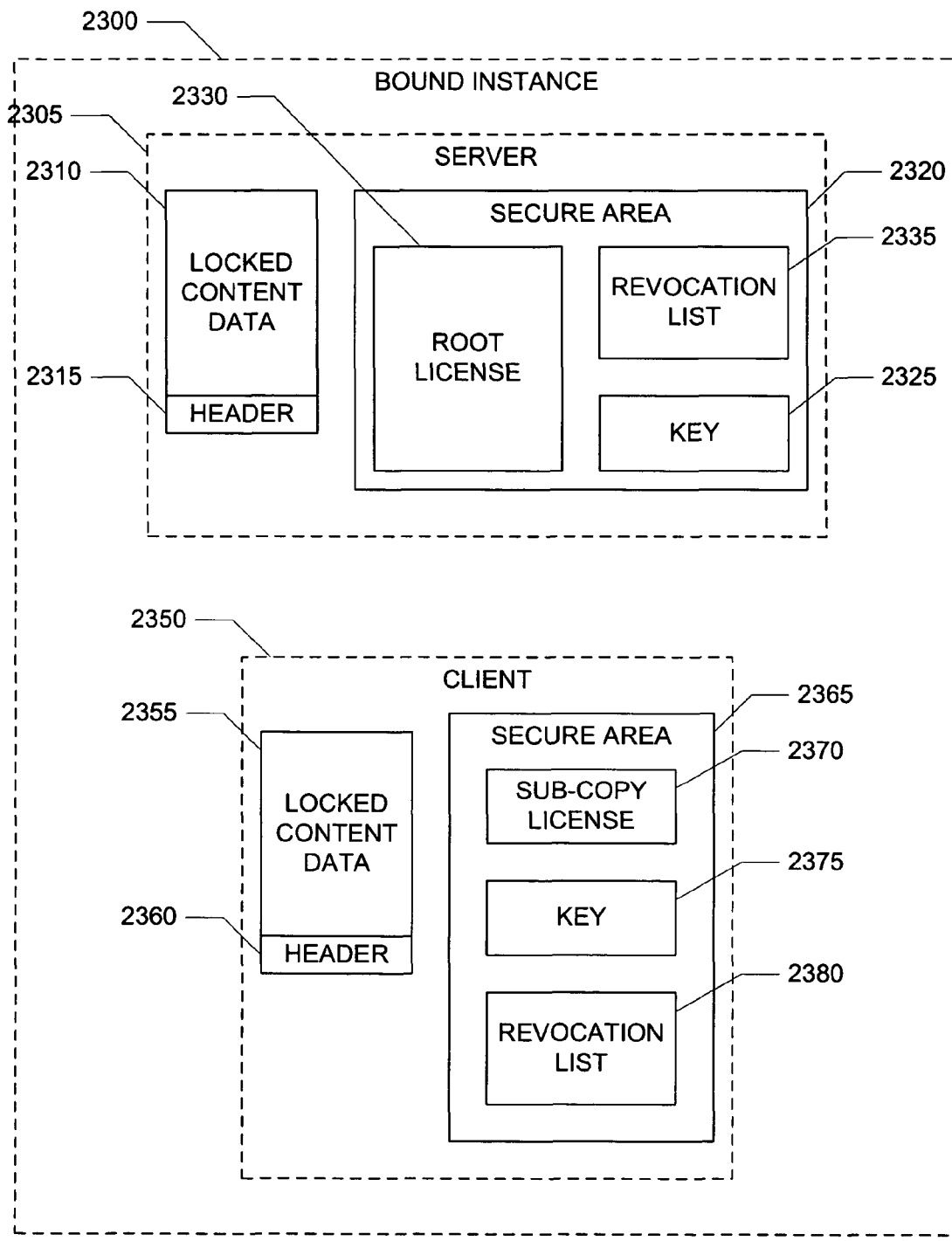
FIG. 23 shows a representation of one implementation of a bound instance and a sub-copy.

FIG. 23 shows a representation of one implementation of a bound instance 2300, including components stored on a server 2305 and on a client 2350. The bound instance 2300 is similar in structure to the discrete instance 2205 in FIG. 22, but can include data stored on a server and data stored on zero or more of the clients in the hub network. The server components 2305 include: locked content data 2310, header information 2315, and a secure area 2320 that includes a key 2325, a root license 2330, and a revocation list 2335. The locked content data 2310 in the server components 2305 is the source version of the locked content data of the bound instance 2300. The server uses the source version for making sub-copy versions of the locked content data (e.g., locked content data 2310 discussed below). The source version is the highest resolution version of the content in the hub network. If different devices request different resolution copies, those copies can be made from the source version. The licensing authority data of the header information 2315 indicates an external licensing authority (e.g., the same authority as that indicated by the discrete instance upon which the bound instance is based) and the server as a local licensing authority. Some implementations of bound instances do not include absolute licensing authority data (e.g., using whatever license is provided along with the locked content data). The root license 2330 indicates the set of permissions defined for the specific locked content data 2310, including presenting, copying, and moving as appropriate for a bound instance (e.g., moving is not permitted, but creating and providing sub-copy versions to other devices is permitted). The root license 2330 is cryptographically bound to the specific server. The root license 2330 defines what types of licenses are available for sub-copies in the hub network. In one implementation, the root license 2330 includes a flag to indicate that the bound instance 2305 is a bound instance. In one implementation, the root license is different depending on whether the server is a server device or a server/client device. The revocation list indicates devices for which authorization has been revoked. As noted above, a compliant device maintains its own revocation list (e.g., a server maintains a server or device revocation list, a client maintains a client revocation list). When a server receives a bound instance, the server adds to its revocation list any devices in the revocation list(s) of the bound instance that are not on the server's revocation list. A compliant server device will not present or play a bound instance if that device is listed in the server's revocation list. A compliant server will not unbind (make discrete) a bound instance if that server is listed in the server's revocation list. A compliant server will not provide a sub-copy version or a license to a device that is listed in the server's revocation list. In another implementation, a compliant server will provide a sub-copy version to a device listed in the revocation list, but will not provide a license to that device.

The components stored on a client 2350 are similar to those stored on a server 2305, but the license is different. The client components 2350 include: locked content data 2355, header information 2360, and a secure area 2365 that includes a key 2370, a sub-copy license 2375, and a revocation list 2380. The licensing authority data of the header information 2360 indicates an external licensing authority (e.g., the same authority that indicated by the discrete instance upon which the bound instance is based) and the server corresponding to the bound instance as a local licensing authority. As noted above, some implementations of bound instances do not include licensing authority data. The sub-copy license 2375 indicates the set of permissions defined for the specific locked content data 2355 according to the root license of the corresponding bound instance, including rules for presenting the content such as any time restrictions. The sub-copy license 2375 is cryptographically bound to the specific client. The sub-copy license 2375 includes an expiration period for when the client is unable to refresh the license, as discussed below. As discussed above, a client device maintains a revocation list and updates the revocation list according to the revocation list 2380. A compliant client device will not present or play a sub-copy version if that device is listed in the client's revocation list. In one implementation, a compliant device also will not provide a sub-copy to a device that is listed in the client's revocation list.

In one implementation, similar to the discrete instance, the locked content data and the secure areas of a bound instance are encrypted using different techniques. The locked content data (the source version and any sub-copy versions) is encrypted using a content encryption technique. The secure areas are encrypted using a hub network encryption technique. In one example, a compliant device holds a hub network key for decrypting the secure area including the key (which was encrypted using hub network encryption), and uses the decrypted key from the secure area to decrypt the locked content data (which was encrypted using content encryption).

In another implementation, locked content data and a license (or the entire secure area) of a bound instance can be managed and distributed separately. Similarly, the locked content of a discrete instance can be distributed separately. In this case, a compliant device will not present locked content data without first obtaining a valid license. Devices can distribute locked content data outside the hub network, but recipients will still need new licenses. In addition, in this way, an intermediary device can act as a conduit for refreshing a license of a disconnected member device outside the local environment of the hub network by passing a license from the server to the disconnected client, as described below.

Multiple discrete instances of the same content are treated as distinct discrete instances and are unrelated. Similarly, if multiple discrete instances of the same content are bound to a hub network each creates a distinct bound instance. In another implementation, the server recognizes when multiple discrete instances of the same content are present (e.g., through identifying information in the content or header information), and the licensing information for the instances allows the bound instances to be treated as related. For example, if multiple related instances are present, freeing one related instance need not disable locked content data for the remaining related bound instances.

In another implementation, an instance or copy of content can be in a third state as well: unrestricted. Unrestricted instances and copies can be moved, copied, and played in and out of a hub network. A compliant device will not change the state of an unrestricted instance to bound or discrete. When a user requests that content be added to a hub network, the server checks for copy control information and adds the content as a bound instance if the server identifies controlled states (defining the root license according to the copy control information). If a user requests adding an instance that does not include any detected copy controls or media network environment information (e.g., is not a discrete or bound instance), the device can add the content as an unrestricted instance.

Returning to FIG. 17, two content items A and B are bound to the hub network HN1. For the bound instances of each of the two items of content A and B, the server/client device 1705 stores a source version of locked content data, indicated by the "A" and "B" labels. The storage client device 1720 stores a sub-copy version of locked content data for each of the two content items A and B, indicated by the "a" and "b" labels.

One content item X is bound to the hub network HN2. The server device 1715 stores a source version of content X, indicated by the "X" label. The server/client device 1705 and the storage client device 1720 each store a sub-copy version for the content item X, indicated by the "x" label. The server device 1715 also stores a discrete version of locked content data for a discrete instance of content Y, indicated by the "Y" label.

The storage device 1730 stores a discrete version of content Z, indicated by the "Z" label.

Content State Transitions

A server manages the state of compliant instances of content in the hub network. A server binds an instance to a hub network by changing the state of a discrete instance to bound. A server removes or frees an instance from a hub network by changing the state of the bound instance to discrete and disabling the corresponding locked content data in the hub network.

Figure 24:
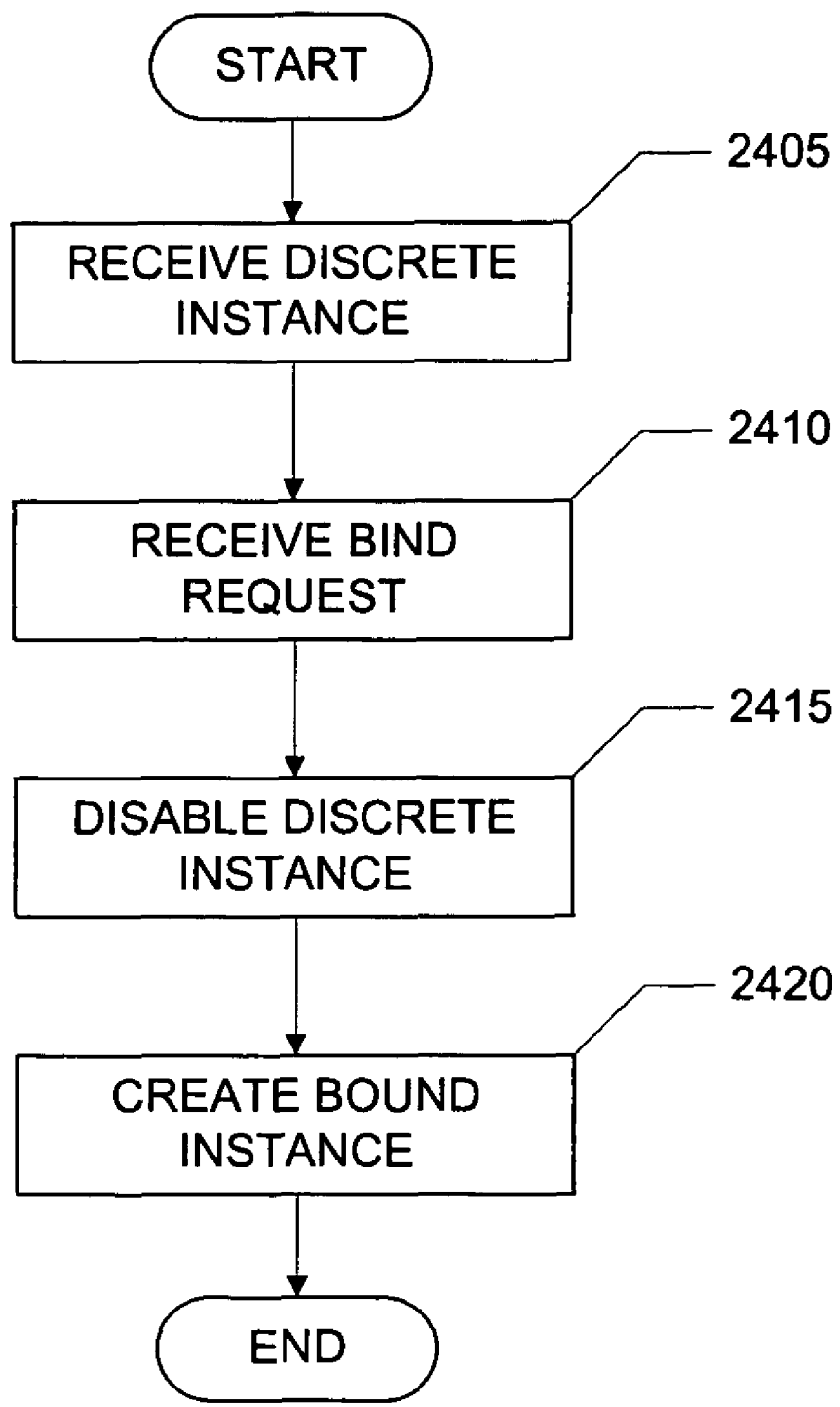
FIG. 24 shows a flowchart of one implementation of binding a discrete instance to a hub network.

FIG. 24 shows a flowchart 2400 of one implementation of binding a discrete instance to a hub network. Initially, the server receives the discrete instance, block 2405. As discussed above, the discrete instance can be in various forms on compliant media, such as an electronic file (or files) stored on compliant storage media (e.g., optical disc), or an electronic file (or filed) stored in storage of the server (e.g., received by download through a network connection). The server does not yet make a copy of the discrete instance, because the server will not make copies of discrete instances that are not being bound to the hub network (though a server may make a copy of the locked content data of a discrete instance).

The server receives a request from a user to bind the discrete instance to the hub network, block 2410. In one implementation, the server waits for a request from the user. In another implementation, the server sends a query to the user when the server receives the discrete instance, querying whether the server should bind the discrete instance to the hub network.

After the server receives the bind request, the server disables the discrete instance block 2415. By disabling the discrete instance, compliant devices will not present or play the discrete instance. In one implementation, the server disables the discrete instance by disabling the license for the discrete instance. In another implementation, the server disables the discrete instance by setting a flag in the data of the discrete instance, so that a compliant device will not present the discrete instance. In another implementation, the server disables the discrete instance by encrypting some or all of the discrete instance with a key private to the server. In another implementation, the server disables the discrete instance by registering the discrete instance as being disabled with a central database or authority (e.g., with which devices check before presenting or playing content data). In another implementation, the discrete instance is only partially disabled such that devices that are members of the hub network to which the disabled discrete instance has been bound can present or play the discrete instance as a sub-copy. If the server cannot disable the discrete instance, the server does not bind the discrete instance to the hub network.

The server creates a bound instance from the discrete instance, block 2420. The server copies the discrete instance, including copying the locked content data, header information including the licensing authority information, the key to unlock the locked content data, the discrete license, and the revocation list (if present). The server stores the copy of the locked content data as the source version of the locked content data for the bound instance. The server modifies the discrete license to be a root license as appropriate to manage the bound instance, rather than the discrete instance. Alternatively, the server does not copy the discrete license and instead generates a new root license using the discrete license. In another implementation, the server also or instead contacts an external licensing authority indicated by the licensing authority information to update or generate the root license. In one implementation, if the server is not a server/client device and so does not present content, the root license does not store licensing information pertaining to presentation permissions for the server.

In an alternative implementation, the server disables the discrete instance by deleting some or all of the discrete instance. In this case, the server first establishes the bound instance of the discrete instance before deleting the discrete instance.

In another implementation, the server converts the discrete instance into a bound instance. In this case, the server does not make a copy of the discrete instance. Instead, the server changes the licensing authority information and the license as appropriate to indicate that the discrete instance is now a bound instance.

In one implementation, the server confirms that the server is allowed to bind the discrete instance before disabling the discrete instance and creating a bound instance. The server confirms that the license of the discrete instance permits the server to bind the discrete instance. The server also confirms that the server is not on the server's revocation list. In another implementation, the server also confirms that there is a proper watermark in the locked content data of the discrete instance. If the server does not successfully confirm that binding the discrete instance is allowed, the server does not bind the discrete instance.

In one implementation, the server records the broadcast information and stores it as bound content and establishes the root. The server creates the root license automatically. In an alternative implementation the server uses information in the broadcast to define the root license or uses licensing authority information in the broadcast information to contact an external licensing authority to obtain a license to build the root license. In another implementation, a server records content from a broadcast as a discrete instance. In one implementation, the broadcast information includes the key, licensing authority information and licensing information to build the discrete copy. In another implementation, the server records the broadcast information and stores it as bound content and establishes the root. The server uses licensing authority information in the broadcast information to contact an external licensing authority to obtain a license to build the root copy. In one implementation, the server encrypts the media content of the broadcast information according to any copy control information provided by the broadcast.

Figure 25:
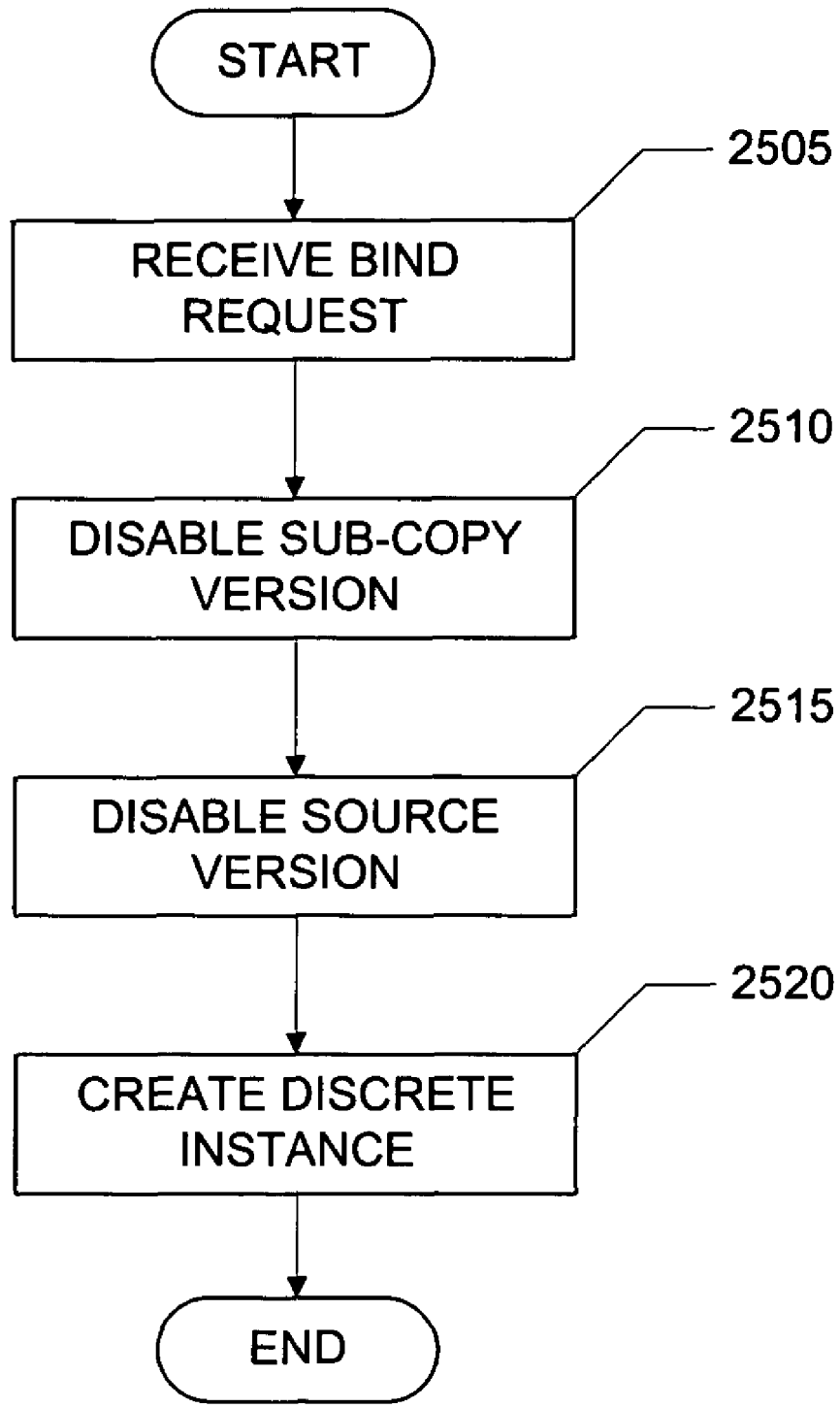
FIG. 25 shows a flowchart of one implementation of freeing a bound instance from a hub network.

FIG. 25 shows a flowchart 2500 of one implementation of freeing a copy of content from a hub network, making the content discrete ("discretification"). Initially, the bound instance is stored on the server and any clients storing sub-copy versions of the content.

The server receives a request from a user to free the bound instance from the hub network and create a discrete instance, block 2505. In one implementation, the server waits for a request from the user. In another implementation, the server sends a query to the user when the server receives a request for an action that is not available for a bound instance, such as moving the bound instance off the hub network. In this case, the query asks whether the server should free the bound instance from the hub network and create a discrete instance.

After the server receives the discrete request, the server causes the clients of the hub network to disable sub-copy versions of the corresponding bound instance, block 2515. The server sends a disable request to each of the members of the hub network, specifying for which bound instance sub-copy versions are to be disabled. Alternatively, the server sends the disable request to members that have sub-copy versions of the bound instance (e.g., as indicated through licenses sent to the clients). The clients receiving the disable request disable all sub-copy versions corresponding to the bound instance. By disabling a sub-copy version, compliant devices will not present or play the disabled sub-copy version. In one implementation, a client disables a sub-copy version by disabling the license for the sub-copy version. In another implementation, a client deletes a sub-copy version to be disabled. In another implementation, a client disables a sub-copy version by setting a flag in the data of the sub-copy version, so that a compliant device will not present the sub-copy version. In another implementation, a client disables a sub-copy version by encrypting the sub-copy version with a key private to the client. In another implementation, a client disables a sub-copy version by registering the bound instance as being disabled with a central database or authority (e.g., with which devices check before presenting or playing a sub-copy version). If a client is disconnected from the hub network at this time, the server generates a request to disable the corresponding sub-copy version when the client device reconnects to the hub network.

After the server disables the sub-copy versions, the server disables the source version, block 2515. By disabling the source version, compliant devices will not present or play the source version. The server disables the source version similarly to the server disabling a discrete instance or a client disabling a sub-copy version, such as by disabling the root license for the bound instance.

The server makes a discrete instance from the bound instance, block 2520. The server copies the bound instance, including copying the source version of the locked content data, header information including the licensing authority information, the key to unlock the locked content data, the root license, and the revocation list (if present). The server stores the discrete instance on internal storage or on external compliant media (e.g., according to the discrete request from the user). The server modifies the root license as appropriate for a discrete instance, rather than a bound instance. Alternatively, the server does not copy the root license and instead generates a new discrete license using the root license. In another implementation, the server also or instead contacts an external licensing authority indicated by the licensing authority information to update or generate the discrete license.

In one implementation, before creating the discrete instance on external compliant media, the server confirms that compliant media is available to store the new discrete instance. If compliant media is not available, the server can create a discrete instance on internal storage or the server can create a non-compliant copy using an approved recording technology (e.g., as approved by the root license or by the configuration of the hub network). In one implementation, examples of approved recording technologies include 4C or D-VHS. Once the server has created the non-compliant copy, the non-compliant copy will not be able to be bound again and the disabled sub-copies will not be able to be enabled (without purchasing a new license). Accordingly, the server requests confirmation before creating the non-compliant copy. If external compliant media is not available and an approved recording technology is not available, the server will not make a discrete instance on external storage. In one implementation, the user can request the creation of a non-compliant copy from a discrete instance regardless of the presence of compliant media (though approved recording technology is still needed).

In another implementation, the server converts a bound instance to a discrete instance. In this case, the server does not need to make a copy of the bound instance. Instead, the server changes the licensing authority information and the license as appropriate to indicate that the bound instance is now a discrete instance.

In another implementation, a storage client device can also change the state of a bound instance to discrete. In this case, the client device informs the server and the server disables the source versions and all remaining sub-copy versions (e.g., by sending disable requests to the other clients). In an alternative implementation, the storage client device requests all member devices of the hub network to disable sub-copy versions of the content (subject to the license of the storage client device). In one implementation, if a client device stores sub-copy versions or stores other locked content data, the client device includes functionality to change the state of the bound instance to discrete.

In one implementation, the server will not free a bound instance that includes time-restricted usage rules in the licensing information. In this case, if the server receives a request to shift the bound instance to a discrete instance, the server declines the request and the bound instance, with corresponding sub-copy versions, remains enabled.

In one implementation, the server confirms that the server is allowed to free the bound instance before disabling the bound instance and creating a discrete instance. The server confirms that the root license of the bound instance permits the server to free the bound instance. The server also confirms that the server is not on the server's revocation list. If the server does not successfully confirm that freeing the bound instance is allowed, the server does not free the bound instance.

Content License Management

A server manages the licenses of sub-copy versions for bound instances bound to the server's hub network. As noted above, when a server binds an instance of content to a hub network, the server creates a bound instance having a root license. The server with the root license for the bound instance is the local licensing authority for that bound instance in the hub network and the server uses the root license to control the licensing of all the sub-copy versions for that bound instance in the hub network.

A compliant device uses a license to use locked content data of an instance of content, such as to present, copy, or move the locked content data. In one implementation, the license indicates the set of permissions defined for specific locked content data. The license permissions indicate permissions for presenting, copying, and moving the locked content data according to type (e.g., discrete instance, bound instance). A license can also indicate conditions for permission, such as based on time (e.g., a time limit for a rental), geography (e.g., region codes), user identity (e.g., a password). A license can be changed or updated through interaction with the licensing authority (e.g., additional payment for sell-through of a rental). A compliant device will not present locked content data without a current, valid, and enabled license. A compliant device requests a new license or confirms the license for locked content data when the compliant device first uses the locked content data. A server only provides licenses to member clients of the server's hub network that are in the local environment of the hub network.

In another implementation, a server will provide a license to a member client that is disconnected and/or outside the local environment of the hub network using an intermediary device (e.g., another client device). The intermediary device acts as a "conduit" for the license (similar to adding a remote device as a member as described above). The server and the client are either not connected or the client is not in the local environment of the server. The intermediary device is connected to both the server and client (e.g., directly, indirectly, or at different times such as when the intermediary device is a portable device moving between the server and client). The intermediary device passes information between the server and client, and eventually passes a license from the server to the client (if the server grants a license to the client).

In one implementation, a client device can extend its license to another member client of the same hub network if both devices are in the same local environment at the time of the transfer. The extended license is the same as (or more restrictive than) the license held by the extending client device, so the extending client will not expand the permissions of the license. The receiving client refreshes the license upon receipt. After the extension, both the extending client and the receiving client have a license.

License Refreshing

The license for a sub-copy version of a bound instance has an expiration period. When the license is received by a client, the client sets an expiration time according to the expiration period of the license and the current time of the client's secure clock. For example, for license with an expiration period of 15 days, the client would set the expiration time to be 15 days from when the license was received. When the clock indicates that the expiration time has been reached, the license expires. A client refreshes the license for each of the sub-copy versions stored by the client periodically by contacting the server storing the root license for the sub-copy version. When the license is refreshed, the client resets the expiration time according to the expiration period of the refreshed license. While the license is not refreshed, the expiration time remains the same and so the remaining time in the expiration period until the expiration time is reached continues to decrease. A client also refreshes all of its licenses for sub-copy versions corresponding to a hub network when the client reconnects to that hub network.

Figure 26:
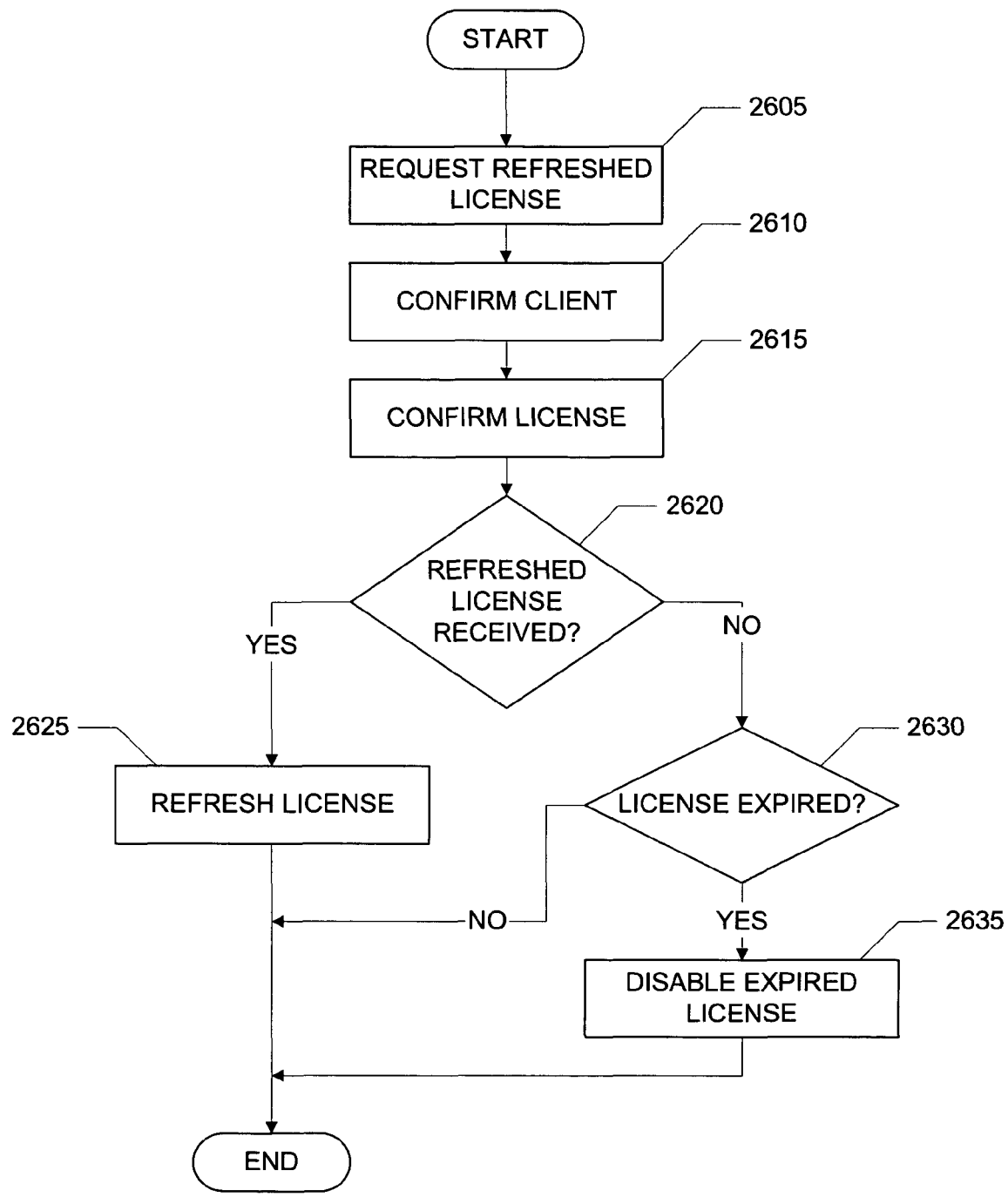
FIG. 26 shows a flowchart of one implementation of updating and refreshing a license.

FIG. 26 shows a flowchart 2600 of one implementation of updating and refreshing a license. Initially, the client stores a sub-copy version of locked content data for a bound instance. The license for the sub-copy version is bound to a particular hub network and so the server for the hub network manages the bound instance corresponding to the sub-copy version stored by the client. When the client received the license for the sub-copy version, the client set the expiration time for the license according to the expiration period and the time of the client's clock. The client's clock is a secure clock and advances at a regular rate. If the client did not receive an enabled license with the sub-copy, the client requests a new or refreshed license upon receipt of the sub-copy.

The client requests a refreshed license from the server, block 2605. The client sends a refresh request to the server for the hub network to which the bound instance of the sub-copy version is bound. The client sends a refresh request to the server periodically, such as once every minute or hour. In one implementation, the server or user can adjust the frequency for clients to request refreshed licenses. In one implementation, the client requests synchronization of time from the server before or in addition to requesting the refreshed license.

The server receives the request and confirms the client is properly configured to receive a refreshed license, block 2610. The server confirms that the client is connected and in the local environment of the hub network (e.g., by pinging the client). If the client is not connected or not in the local environment, the server does not send a refreshed license. The server also confirms that the client has the proper security software and data (e.g., a key). If the client does not have the proper security software and data, the server sends the client a security update including updated software and data. If the server cannot send the client the security update, the server does not send the client a refreshed license. If the server does not receive the refresh request, the server does not send a refreshed license to the client.

After confirming the client, the server confirms the license for the client, block 2615. The server confirms that the client is not on the server's revocation list. In one implementation, the server and the client also exchange and update revocation lists before the server sends a new license to the client. If the client is on the server's revocation list, the server does not send a refreshed license. The server determines whether a license is still available for the client by checking the root license. If the root license indicates that a license is available for the client, the server sends a refreshed license to the client. The refreshed license is not necessarily the same license as that stored in the client. The server can update aspects of the client's license by sending a different license as the refreshed license. For example, in one implementation, the server periodically requests license updates from an external licensing authority and updates the root license accordingly. In another implementation, the root license indicates different licensing permissions according to changing criteria, such as time, payment, or client status. As discussed below, in one implementation, when a new sub-copy version is created, the new sub-copy version has a disabled license and needs a new license specific to the new device. In response to the first refresh request for a new sub-copy version, the server creates a new license using the root license.

If the root license indicates that a license is not available for the client, the server does not send a refreshed license to the client. A license is not available if the root license indicates that the license for the content is no longer valid due to a change in circumstances (e.g., a time period has expired for a rental, or a subscription fee has not been paid). In one implementation, the server also checks with an external licensing authority for some or all refresh requests. In one implementation, the server sends a message to the client explaining the reason for not sending the refreshed license.

In another implementation, the server does not send a refreshed license, but instead sends a message or flag indicating whether the license is able to be refreshed or not, and any changes to the license.

The client determines whether the server sent a refreshed license or not, block 2620. If the client is disconnected from the server, the server will not respond to the refresh request and so the client will not receive a refreshed license. In another implementation, the client first checks for any response from the server. In another implementation, the client does not send a refresh request if the client is disconnected from the hub network and proceeds as though a refreshed license had not been received. If the server is unavailable or disabled, the server will not send a refreshed license. As discussed above, if the server does not successfully confirm the client or the license, the client is not permitted to receive a refreshed license and the server does not send a refreshed license.

If the client receives the refreshed license, the client refreshes the license, block 2625. The client replaces the stored license with the refreshed license. The expiration time is reset back to the maximum of the expiration period.

If the client does not receive the refreshed license, the client determines whether the license has expired or not, block 2630. The license has expired when the expiration period has passed without receiving a refreshed license. The license expires when the client's clock indicates that the expiration time has been reached. In other implementations, different mechanisms can be used to determine when the expiration period has expired, such as a decrementing timer.

If the license has expired, the client disables the license, block 2635. The client disables the license so that the client and other compliant devices will not present that sub-copy version. In one implementation, the client disables the sub-copy version in another way instead or as well, such as encrypting the sub-copy version or deleting the sub-copy version.

When the next period for requesting a refreshed license occurs, the client returns to block 2605. In one implementation, the client may determine that the license has expired independently of requesting a refreshed license (e.g., when the expiration time is between requests for a refreshed license).

In one implementation, if a client does not receive a refreshed license from a server, the client requests a refreshed or new license from an external license authority. As described above, the server is the local licensing authority defined by the licensing authority information in the header information of the sub-copy version. The licensing authority information might also indicate an external licensing authority, such as a central server connected to the client through a network (e.g., the Internet). In one implementation, the client requests a license from the external authority when the server is unavailable, or when the client is not a member of the server's hub network and needs a new license. In another implementation, the licensing authority information indicates a hierarchy of authorities (e.g., local, regional, national, and absolute).

Figure 28:
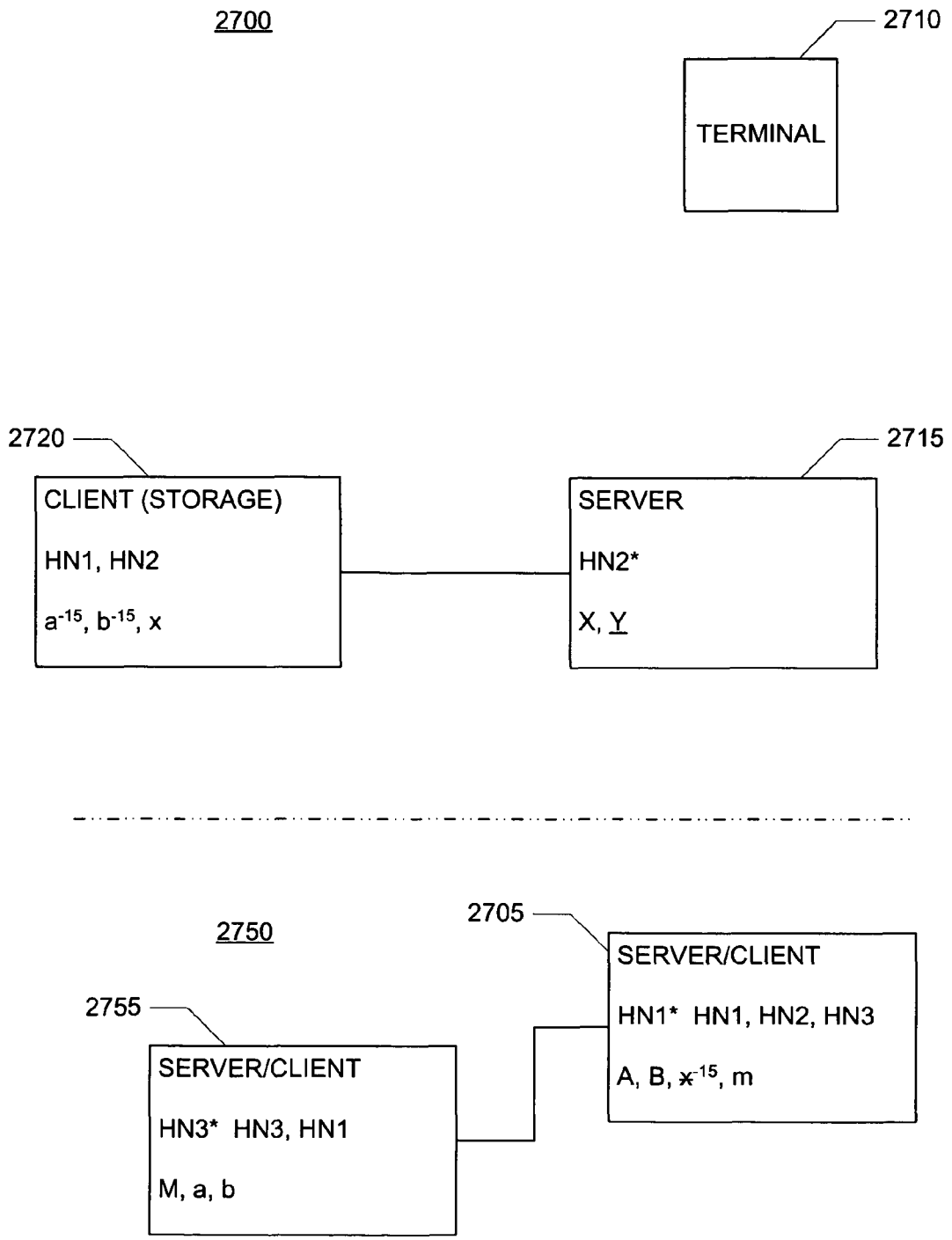

FIGS. 27-29 illustrate an example of disconnecting a device from a hub network and the operation of expiration periods.

In FIG. 27, two media network environments 2700 and 2750 are in different local environments. The local environments are defined relative to the positions of servers (two servers in close proximity are treated as defining substantially coextensive local environments). The dashed line represents the break between the local environments. The first media network environment 2700 includes four devices: a server/client device 2705 connected to a terminal device 2710 (for presenting content), a server device 2715, and a client device 2720. The server/client device 2705 is the server for a hub network HN1, indicated by the "HN1*" label. The server/client device 2705 and the client device 2720 are clients in the hub network HN1, indicated by the "HN1" label. The server device 2715 is a server for a hub network HN2, indicated by the "HN2*" label. The server/client device 2705 and the client device 2720 are clients in the hub network HN2, indicated by the "HN2" label.

Two content items A and B are bound to the hub network HN1. The server/client device 2705 stores a source version and manages root responsibility for each of the two content items A and B, indicated by the "A" and "B" labels. The client device 2720 stores a sub-copy version for each of the two content items A and B, indicated by the "a" and "b" labels.

One content item X is bound to the hub network HN2. The server device 2715 stores a source version and manages root responsibility for the content item X, indicated by the "X" label. The server/client device 2705 and the client device 2720 each store a sub-copy version for the content item X, indicated by the "x" label. The server device 2715 also stores a discrete version of the content item Y, indicated by the "Y" label.

The second media network environment 2750 includes one device: a server/client device 2755. The server/client device 2755 is the server for a hub network HN3, indicated by the "HN3*" label. The server/client device 2755 is a client in the hub network HN3, indicated by the "HN3" label.

One content item M is bound to the hub network HN3. The server/client device 2755 stores a source version and manages root responsibility for the content item M, indicated by the "M" label.

In FIG. 28, the server/client device 2705 moves to the second media network environment 2750 and becomes a member of the hub network HN3 as a client, indicated by the "HN3" label. The server/client device 2705 is still a client in both of the hub networks HN1 and HN2, indicated by the "HN1" and "HN2" labels. The server/client device 2705 receives a sub-copy version of the content item M, indicated by the "m" label. The server/client device 2755 joins the hub network HN1 as a client, indicated by the "HN1" label. The server/client device 2755 receives a sub-copy version for each of the content items A and B, indicated by the "a" and "b" labels.

By moving to the second media network environment 2750, the server/client 2705 has taken the local environment for the hub network HN1 to the second media network environment 2750. As a result, the client device 2720 is no longer in the local environment of the hub network HN1 and so the client device 2720 is disconnected from the hub network HN1. Being disconnected, the client device 2720 cannot refresh the licenses for the sub-copy versions a and b of the content items A and B and so the expiration times for the sub-copy versions a and b will not be reset, indicated by the "$a^{-15}$" and "$b^{-15}$" labels.

In addition, when the server/client device 2705 leaves the media network environment 2700, the server/client device 2705 becomes disconnected from the hub network HN2 because the server/client device 2705 has left the local environment of the hub network HN2. Being disconnected, the server/client device 2705 cannot refresh the licenses for the sub-copy version x of the content item X and so the expiration time for the sub-copy version x will not be reset, indicated by the "$x^{-15}$" label. However, the server/client device 2705 has become a member of the hub network HN3 and the hub network HN3 is in a different local environment than the hub network HN2. As discussed above, in one implementation, when a spanning device is a member of two hub networks that are in different local environments, the client will only present sub-copy versions from the hub network to which the device has been most recently connected, in this case the hub network HN3 (and the hub network HN1 because the server/client device is the server for the hub network HN1). Accordingly, the sub-copy version x for the content item X is temporarily disabled until the server/client device 2705 is again connected to the hub network HN2, indicated by the "$*^{-15}$" label (strike through). In an alternative implementation, the spanning device client does not temporarily disable sub-copy versions from remote hub networks and continues to monitor the expiration period for the sub-copy versions that are not being refreshed, as described above.

In FIG. 29, the server/client device 2705 has returned to the first media network environment 2700 and connected to the server device 2715 and the client device 2720, reconnecting to the hub network HN2. As a result, the client/server device 2705 can refresh the license for the sub-copy version x and the client device 2720 can refresh the licenses for the sub-copy versions a and b, indicated by the removal of the superscripts.

By the server/client device 2705 leaving the second media network environment 2750, the server/client device 2705 is disconnected from the hub network HN3 and the server/client device 2755 is disconnected from the hub network HN1. As a result, the server/client device 2705 cannot refresh the license for the sub-copy version m so the expiration time is not reset and the sub-copy version m is temporarily disabled, as indicated by the "$-^{15}$" label. The server/client device 2755 cannot refresh the licenses for the sub-copy versions a and b so the expiration times are not reset, indicated by the "$a^{-15}$" and "$b^{-15}$" labels.

Content Presentation

A client device presents or plays content. Some client devices include integrated presentation components and present content data directly. Some client devices present content data through a connected device, such as a terminal device. Some clients present content data in either or both ways. A storage client device presents content data stored in a sub-copy on the client device or in content data streamed from the server. A non-storage client device presents content data streamed from the server. Returning to FIG. 17, the dashed line from the server device 1715 to the non-storage client 1725 indicates streaming content data from the server device 1715 to the non-storage client 1725. In one implementation, presented content data includes output controls to control unauthorized copying (e.g., data or processing to prevent or inhibit copying of the output data). Some servers include server and client functionality and this kind of server will present content similarly to a client.

Figure 30:
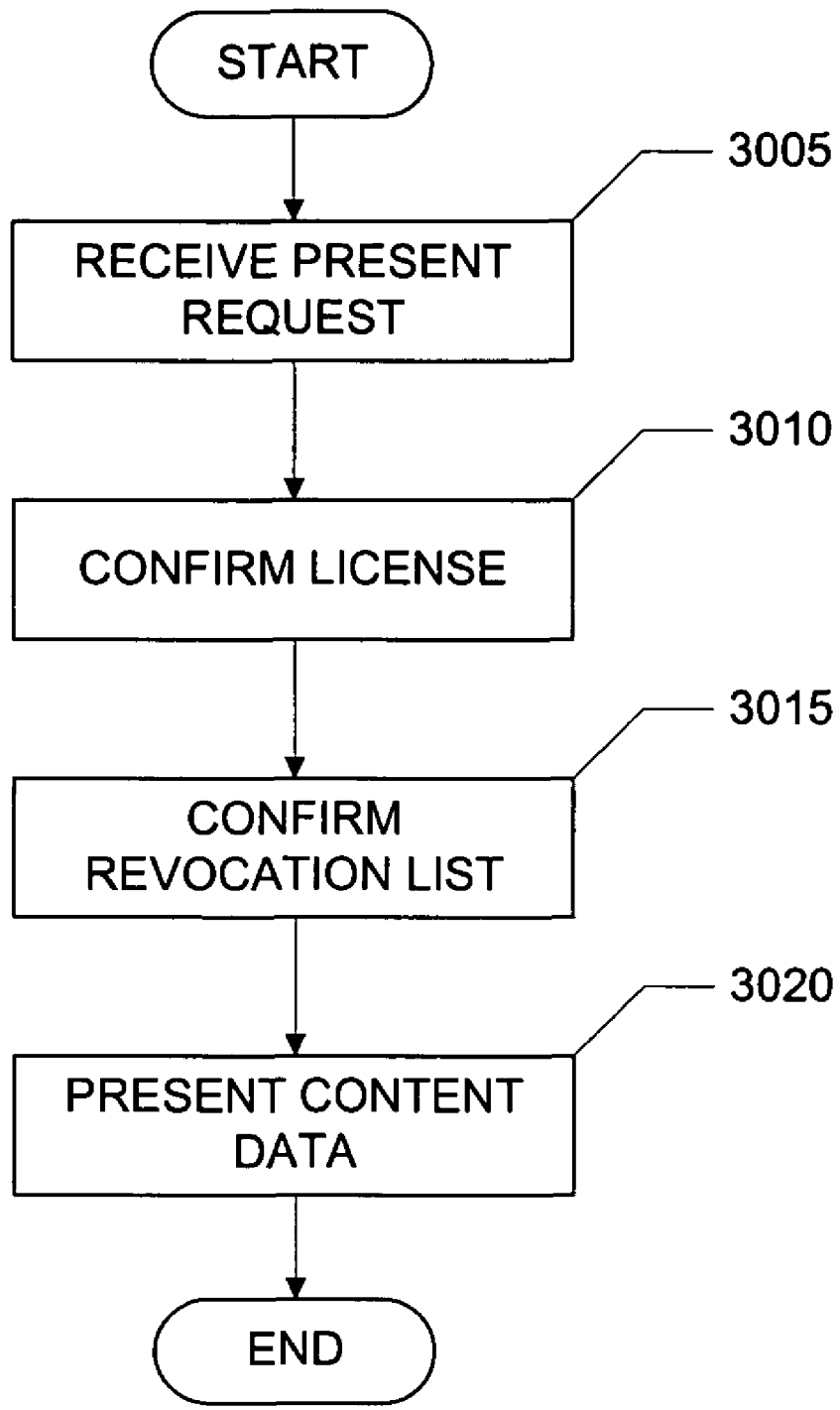
FIG. 30 shows a flowchart of one implementation of a client device presenting content data stored in a sub-copy on the client device.

FIG. 30 shows a flowchart 3000 of one implementation of a client device presenting content data stored in a sub-copy version on the client device. Initially, the client device is a storage client device and stores a sub-copy version of the locked content data to be presented.

The client receives a request to present the content, block 3005. The request is from a user and indicates an item of content. In another implementation, the request is from another device or is automated.

The client confirms that the license permits presenting the sub-copy version, block 3010. The license may change or be updated as the license is refreshed, so the client checks the license before presenting the sub-copy version. If the license is not current, is not valid, or is disabled, the client will not present the sub-copy version. In one implementation, if the client does not have a current, valid, and enabled license, the client requests a new license from the server and the server refers to the root license of the corresponding bound instance. If the server declines this request (e.g., because the client is not entitled to a new license), the client will not present the sub-copy version.

The client also confirms that the client is not on any revocation list available to the client, block 3015. If the client is on a revocation list, the client will not present the sub-copy version.

After successfully confirming the license and the revocation list, the client presents the content data of the sub-copy version, block 3020. The client presents the content of the sub-copy version by decrypting the locked content data to generate output data and outputting the output data to integrated presentation components, external presentation components, or a terminal device.

A compliant device presents content data from a discrete instance in a similar way.

As noted above, a server including client functionality presents content data in a similar way. In another implementation, a server device and a client device coexist on the same physical device and so the server relies on the resident client to present content.

Figure 31:
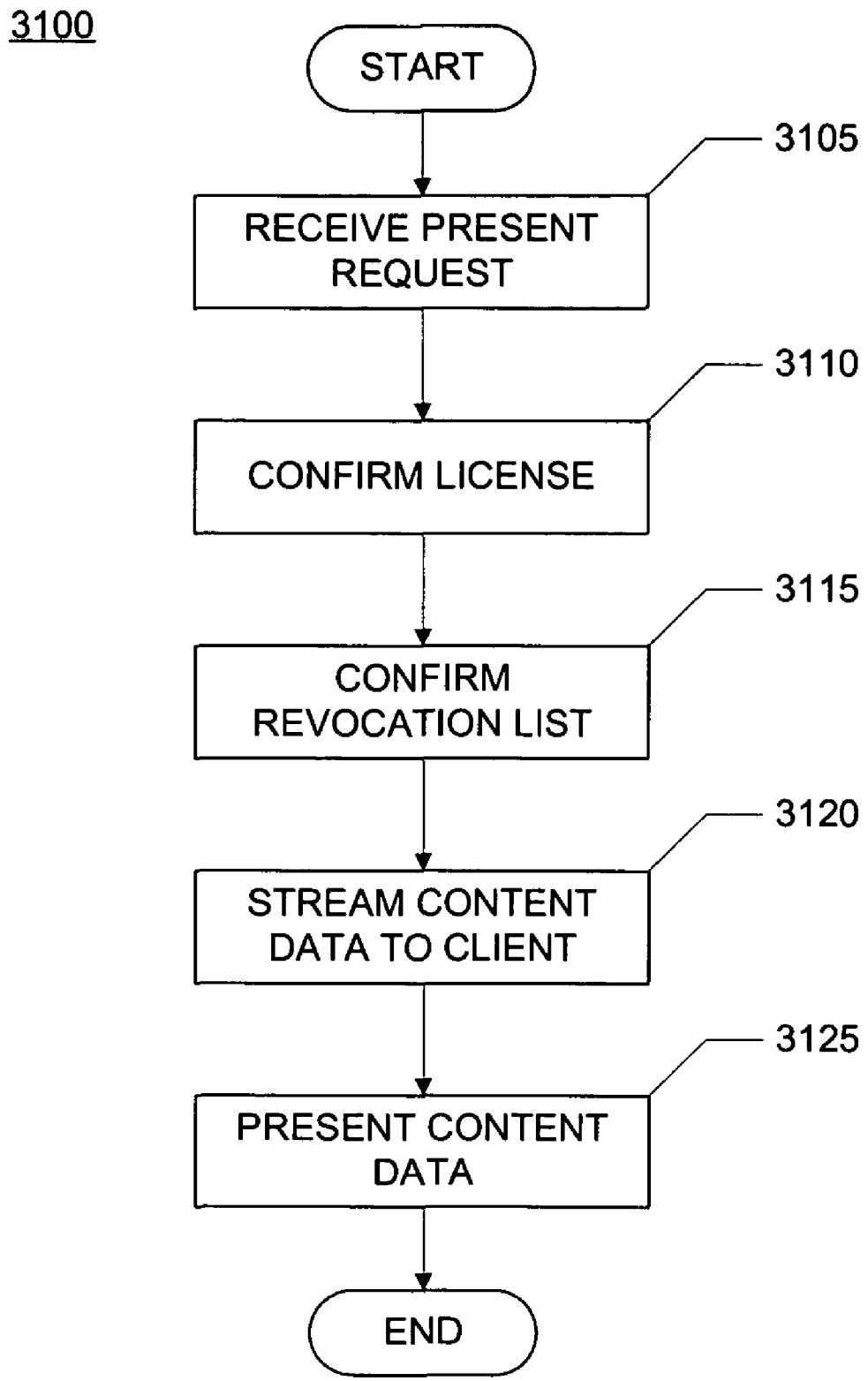
FIG. 31 shows a flowchart of one implementation of streaming content data from a bound instance on a server to a client.

FIG. 31 shows a flowchart 3100 of one implementation of streaming content data from a server to a client. Initially, a server creates a bound instance of content and a client device is connected to the server.

The client receives a request to present the content, block 3105. The request is from a user and indicates an item of content. In another implementation, the request is from another device or is automated. The client sends a streaming request to the server managing the bound instance indicated by the present request. In another implementation, the server receives the present request and the request also indicates the client device to present the content.

The server confirms that the root license permits presenting the content data by streaming to the indicated client, block 3110. The license may change or be updated as the license is refreshed, so the server checks the license before streaming the content data from the source version of that bound instance. If the license is not current, is not valid, or is disabled, the server will not stream the content data. The server will not stream the content data to clients that are not members of the hub network.

The server also confirms that the client is not on a revocation list available to the server, block 3115. If the client is on an available revocation list, the server will not stream the content data.

After successfully confirming the license and revocation lists, the server streams the content data from the source version of that bound instance to the client, block 3120. In one implementation, the server streams the locked content data of the source version to the client.

As the client receives the streaming content data, the client presents the content data, block 3125. The client does not store the streaming content data (other than transiently in the process of presenting the content data). The client presents the content data by outputting content data to integrated presentation components, external presentation components, or a terminal device.

In another implementation, the server encrypts the locked content data (e.g., using an encryption technique for streaming data) and streams the encrypted locked content data to the client. The client decrypts the encrypted locked content data to obtain the locked content data and then decrypts the locked content data to obtain output data. The client presents the output data. In alternative implementations, different combinations of encryption and decryption between the server and client can be used. For example, the server can decrypt the locked content data to obtain output data and then encrypt the output data. The server then streams the encrypted output data to the client and the client decrypts the encrypted output data.

In one implementation, a compliant device can always output data to a connected terminal device because the terminal device will not store the received output data (other than transiently) and the connection and transmission to the terminal device is reasonably secure. In one implementation, when a compliant device sends output data to a terminal device, that compliant device sends the same data to all terminal devices receiving data from the compliant device.

In one implementation, a compliant device will stream discrete content to another compliant device, but the receiving device will not store any of the streamed content data (other than transiently in the process of presentation).

A client device will not stream content data for a sub-copy version. In another implementation, a storage client device will stream content data for a sub-copy version to another member client.

Content Copying and Moving

A compliant device can create a sub-copy version from a source version or copy a sub-copy version. A compliant device can freely provide a sub-copy version to another member of the hub network. A compliant device can provide a sub-copy version to a compliant device that is not a member of the hub network to which the bound instance is bound, but the non-member will need to obtain a new valid license before being able to present the content data of the sub-copy version. A compliant device can provide a sub-copy version to a non-compliant device, but the non-compliant device will not be able to present the locked content data of the sub-copy version. The non-compliant device can move the sub-copy version to a compliant device and that compliant device will be able to present the sub-copy version after obtaining a new valid license.

A compliant device will not copy a discrete instance (other than in the process of shifting the instance from discrete to bound on the hub network). Similarly, a compliant device will not create a backup copy of a discrete instance. A compliant device can make a copy of the discrete version of the locked content data of a discrete instance (similar to a sub-copy version) and provide that copy to another device, but the receiving device will need to obtain a new valid license before being able to present the received copy of locked content data.

A server will not move a source version and root responsibility to another server directly. In one implementation, to move root responsibility from one server to another, a server converts the bound instance to a discrete instance, moves the discrete instance to another server, and the second server converts the discrete instance back to a bound instance, establishing a new root. A spanning device can facilitate the transfer of a discrete instance from one hub network to another by allowing a server to transfer a discrete instance through the spanning device to another compliant server. In another implementation, a server moves root responsibility directly to another compliant server that shares a common client device.

A server will not move a source version or root responsibility to a client (unless the client is also a server).

A compliant device can move a discrete instance using compliant media, secure transmission, or compliant recording technologies. As described above referring to creating a discrete instance from a bound instance, in one implementation, before moving the discrete instance to external media, the compliant device confirms that the external media is compliant media. If compliant media is not available, the compliant device can create a non-compliant copy on non-compliant media using an approved recording technology. Once the compliant device has created the non-compliant copy, the non-compliant copy will not be able to be bound again. Accordingly, the compliant device requests confirmation before creating the non-compliant copy. If external compliant media is not available and an approved recording technology is not available, the compliant device will not move the discrete instance to external storage.

Compliant devices transport sub-copy versions to other compliant devices using a secure transmission. In another implementation, compliant devices can transport sub-copy versions (without licenses or keys) across non-secure connections as well. A compliant device can also use compliant physical media to transfer a sub-copy version to another compliant device, subject to the restrictions described herein.

Figure 32:
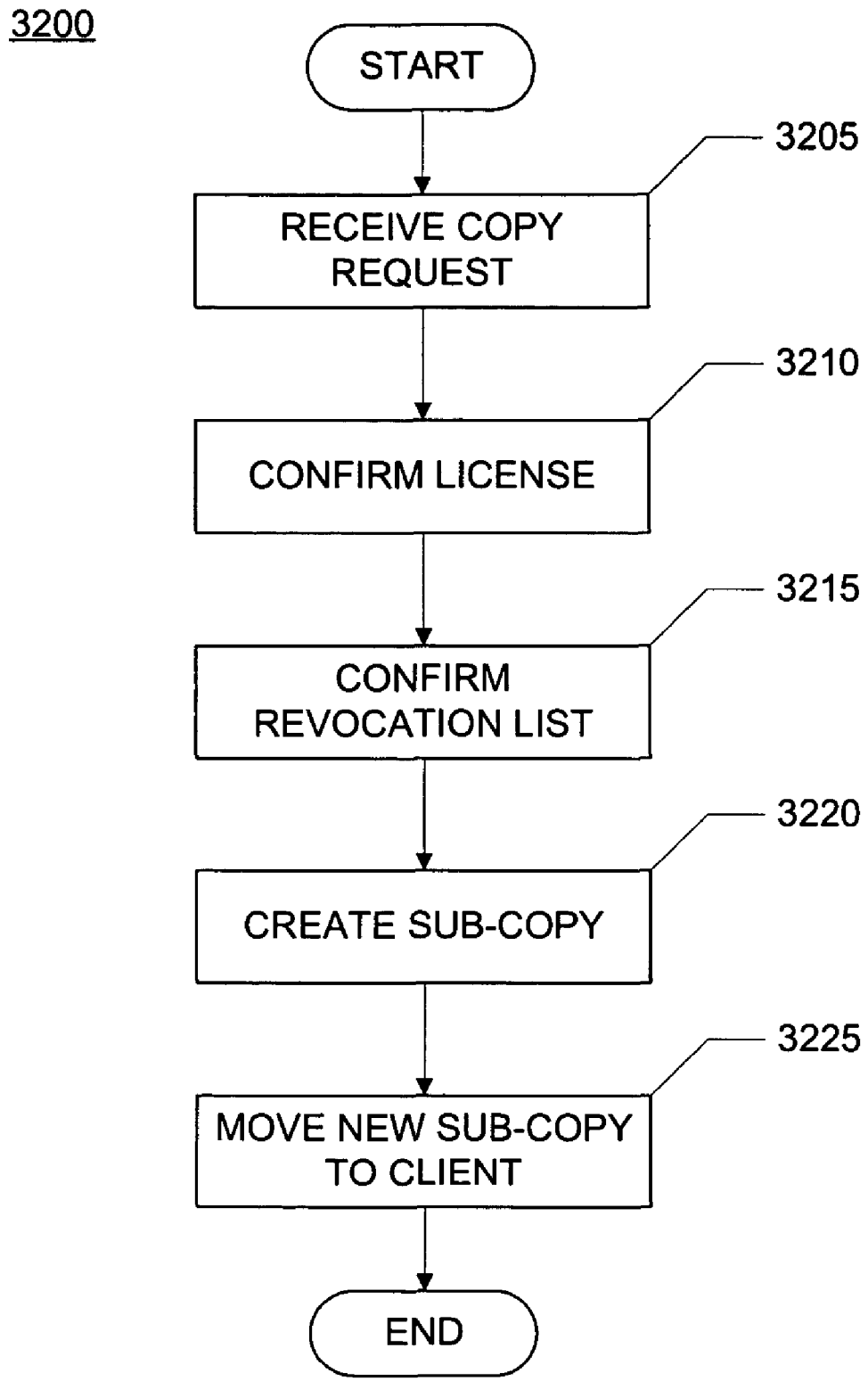
FIG. 32 shows a flowchart of one implementation of creating a sub-copy.

FIG. 32 shows a flowchart 3200 of one implementation of creating a sub-copy version of locked content data for a member client. Initially, a server manages a bound instance of content, storing a source version and root license for the bound instance. As discussed above, the server uses the source version for making sub-copy versions for the hub network.

The server receives a request to create a sub-copy version, block 3205. The request is from a user and indicates an item of content and a client to receive the sub-copy version. Alternatively, the copy request does not indicate a destination for the new sub-copy version (e.g., the copy request is followed by a request to move the new sub-copy version to a destination client). In another implementation, the request is from another device or is automated. In another implementation, a client receives the copy request and passes the request to the server. In one implementation, the copy request indicates a target resolution. If the target resolution is different from the resolution of the source version (or sub-copy version being copied), a conversion can be performed using the source version as the highest resolution copy in the hub network (or sub-copy version being copied). In another implementation, the copy request indicates a target format. The server performs any transcoding as part of the copying process using the sub-copy version to be copied or the source version. Alternatively, target resolutions and formats can be converted and transcoded on demand by clients for presentation.

The server confirms that the license permits providing a sub-copy version to the indicated client, block 3210. The license may change or be updated as the license is refreshed, so the server checks the license before creating the sub-copy version. If the license is not valid or is disabled, the server will not create the sub-copy version. As described below, in another implementation, the server does not confirm the license before making a sub-copy version. Instead, the server checks the license when creating a new license for the sub-copy version.

The server also confirms that the client is not on the server's revocation list, block 3215. If the client is on the revocation list, the server will not create the sub-copy version.

After successfully confirming the license and the revocation list, the server creates the sub-copy version, block 3220. The server creates a new sub-copy version from the source version, storing the new sub-copy version on the server. Referring to FIG. 23, the server creates a sub-copy version 2355 from a source version 2310. The server also copies the header information including the licensing authority information. The server does not copy the root license, the key for unlocking the locked content data, or the revocation list of the source version. The server creates a new sub-copy license for the sub-copy version according to the root license. However, the license for a new sub-copy version is initially disabled. To enable the license or receive a new license, the recipient client will contact the server to refresh the license and receive a new license specific to the new sub-copy version. In one implementation, the server provides an enabled license with the new sub-copy version. The server provides the key for unlocking the sub-copy version and a revocation list based on the server's revocation list when the server provides a license to the client.

After creating a new sub-copy version, the server moves the new sub-copy version to the destination client, block 3225. In one implementation, to move the new sub-copy version, the server sends another copy of the new sub-copy version and any accompanying data (e.g., license) to the client and deletes the first new sub-copy version on the server. The client receives and stores the new sub-copy version. In another implementation, the server creates the new sub-copy version directly on the client, and so skips block 3225. In another implementation, the server creates and provides the sub-copy license later in response to a request for a new license from the client.

In another implementation, the root license allows a limited number of sub-copy versions to be made. In this case the server maintains a count of the number of sub-copy versions made (e.g., by counting the number of times sub-copy licenses have been made from the root license), storing the copy count in the root license. If the limit has been reached, the server will not make another sub-copy version from the source version of the bound instance. The copy count can be reduced by deleting or disabling sub-copy versions in the hub network if the server is informed of the deletion or disablement.

In another implementation, a client is only allowed to have a certain number of licenses. When a client receives a new sub-copy version and sub-copy license (by copying or moving), the client determines if the client's limit on licenses has been exceeded. If so, the client disables the license for the new sub-copy version until some other license is disabled to bring the number of licenses below the limit again.

In one implementation, a storage client device can also make copies of a sub-copy version stored on the client. In this case, the storage client device makes a sub-copy version as described above for the server referring to FIG. 32.

In one implementation, a request to move a sub-copy version is handled in a similar way. A server or client receives the request and confirms that the license allows the sub-copy version to be moved to the indicated client. The server or client confirms that the indicated client is not on the server or client's revocation list. If the confirmation is successful, the server or client moves the sub-copy version and any corresponding data (e.g., license) to the indicated client.

In another implementation, clients can move and copy sub-copy versions without confirmation, but will not move or copy licenses. Similarly, a server can create and distribute sub-copy versions without first confirming the root license and revocation list. In this case, servers and clients can distribute sub-copy versions to compliant and non-compliant devices without restrictions. A non-compliant device will not be able to present the locked content data, but can pass the sub-copy version to a compliant device. A recipient compliant device will obtain a license (e.g., as indicated by licensing authority information in the header of the sub-copy version) before being able to present the locked content data of the sub-copy version. In another implementation, a client can move a copy of a license to provide the license to a disconnected member client.

When a server or client provides a sub-copy version to a compliant device that is not a member of the hub network, the server or client does not provide a valid license with the sub-copy version. The recipient later obtains a valid license using the licensing authority information stored in the sub-copy version. In this way, a compliant device can distribute a sub-copy version to other hub networks.

In an alternative implementation, a local environment is defined in absolute terms, such as a 100 meter radius circle with the center at a defined geographical point. For example, media may be restricted to being used at a particular physical location, such as confidential documents being limited to a specific building. As discussed above, when a device leaves the local environment, the device is disconnected from the hub network (though the device may still be a member). In this case, a server could be disconnected from its own hub network, and so none of the devices would be able to refresh the licenses for that hub network while the server was disconnected, including the server. In another alternative implementation, hub networks are not restricted by local environment. In this case, a device is unable to refresh a license when the device is unable to communicate with the server (e.g., the physical or network connection is broken).

The various implementations of the invention are realized in electronic hardware, computer software, or combinations of these technologies. Most implementations include one or more computer programs executed by a programmable computer. For example, referring to FIG. 17, in one implementation, each of the server/client device 1705, the server device 1715, the storage client device 1720, and the non-storage client device 1725 includes one or more computers executing software implementing the client and server operations discussed above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers). In some implementations, the computers are included within consumer electronic devices.

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. Some implementations include less than all of and/or variations of the aspects described above. For example, while the above description focuses on implementations using copies of content described as audio and/or video data, the copies can be of other types of data as well, such as numerical data or executable software code.

Accordingly, the present invention is not limited to only those implementations described above.

What is claimed is:

1. A method of adding a client as a member of a hub network which includes a plurality of devices, comprising:
    detecting a client newly connected to the hub network by a server,
    wherein the server periodically polls the plurality of devices for the client;
    authenticating the client to determine an identity of the client;
    authorizing the client to determine that the client is a compliant device that operates according to rules defined for the hub network,
    wherein the compliant device enables a user to present, move, and copy content data to be controlled to reflect guidelines of licenses of the content data set for a licensing authority, and
    wherein the client sends a message to the plurality of devices on the hub network indicating that the client is now connected to the hub network;
    adding the client as a member in the hub network when it is determined that the client has been detected, authenticated, authorized, and is in a local environment of the server;
    providing licenses for the content data bound to the hub network to members of the hub network,
    wherein a source version of the content data is stored on the server, and copies of the source versions are stored on the compliant device as sub-copy versions;
    comparing a device count of members in said hub network with a member device limit;
    confirming said device count by contacting an external device registration server;
    sending a device add request to said device registration server;
    receiving a device add permission from said device registration server;
    wherein said device add request includes said device count;
    wherein the device registration server sends the device add permission to add the client as a member if the client has not been added as a member in any other hub network.

2. The method of claim 1, wherein determining that the client is in the local environment of the server comprises
    sending a local environment confirmation request to the client to determine whether the client is in the local environment,
    wherein the local environment is a limited area defined relative to the server.

3. The method of claim 2, further comprising
    receiving a reply from the client in response to the local environment confirmation request.

4. The method of claim 3, wherein determining that the client is in the local environment of the server comprises
    measuring the time between sending the local environment confirmation request and receiving the reply.

5. The method of claim 1, further comprising:
    confirming a device count of members in said hub network by comparing said device count with a member device limit;
    wherein said client will not be added as a member in said hub network if said device count is greater than or equal to said member device limit.

6. The method of claim 5, further comprising:
    increasing said device count after adding said client as a member.

7. The method of claim 1, wherein the rules defined for the hub network comprise
    disabling licenses for the sub-copy versions stored on the client when the client is removed as a member of the hub network.

8. The method of claim 1, wherein the rules defined for a hub network comprise
    disabling a key at the compliant device when the server informs the compliant device that the key has been revoked because the key has been compromised.

9. The method of claim 1, wherein the client is added as a member of the hub network when it is further determined that a set of rules has been met.

10. The method of claim 1, wherein determining that the client is a compliant device comprises
    sending a compliance confirmation request to the client to request information from the client to confirm that the client will abide by the rules defined for a hub network.

11. The method of claim 1, wherein determining that the client is in the local environment of the server comprises
    pinging the client.

12. The method of claim 1, further comprising
    revoking the authorization of the client device when the server determines that the client has circumvented or broken the rules defined for the compliant device.

13. A method of adding a client as a member of a hub network which includes a plurality of devices, comprising:
periodically polling the plurality of devices of the hub network by a server for a client newly connected to the hub network so that the client can be detected by the server;
sending identification information from said client to said server to authenticate the client;
sending a compliance confirmation from the client to the server that confirms the client is a compliant device that operates according to rules defined for the hub network,
wherein the compliant device enables a user to present, move, and copy content data to be controlled to reflect guidelines of licenses of the content data set for a licensing authority, and
wherein the client sends a message to the plurality of devices on the hub network indicating that the client is now connected to the hub network;
receiving an add confirmation at the client from the server indicating that the client has been added as a member in the hub network as the client has been detected, authenticated, confirmed compliant, and is in a local environment of the server;
providing licenses for the content data bound to the hub network to members of the hub network,
wherein a source version of the content data is stored on the server, and copies of source versions are stored on the compliant device as sub-copy versions;
comparing a device count of members in said hub network with a member device limit;
confirming said device count by contacting an external device registration server;
sending a device add request to said device registration server;
receiving a device add permission from said device registration server;
wherein said device add request includes said device count;
wherein the device registration server sends the device add permission to add the client as a member if the client has not been added as a member in any other hub network.

14. The method of claim 13, wherein the rules defined for the hub network comprise
disabling licenses for the sub-copy versions stored on the client when the client is removed as a member of the hub network.

15. The method of claim 13, wherein the rules defined for the hub network comprise
disabling a key at the compliant device when the server informs the compliant device that the key has been revoked because the key has been compromised.

16. The method of claim 13, wherein said compliance information indicates that the compliant device will not decrypt locked content data without a license that is bound to a hub network of which the compliant device is a member.

17. The method of claim 13, wherein the client is in the local environment of the server when the client is in a limited area defined relative to the server.

18. A method of adding a client as a member of a hub network which includes a plurality of devices, comprising:
periodically polling the plurality of devices of the hub network by a server for a client newly connected to the hub network through an intermediary device connected to said server so that the client can be detected by the server;
sending identification information from said client to said server through said intermediary device to authenticate the client;
sending a compliance confirmation from the client to the server through the intermediary device that confirms the client is a compliant device that operates according to rules defined for the hub network;
wherein the compliant device enables a user to present, move, and copy content data to be controlled to reflect guidelines of licenses of the content data set for a licensing authority; and
wherein the client sends a message to the plurality of devices on the hub network indicating that the client is now connected to the hub network;
receiving an add confirmation at said client from said server through said intermediary device indicating that the client has been added as a member in said hub network as the client has been detected, authenticated, confirmed compliant, and is in a local environment of the server;
providing licenses for the content data bound to the hub network members of the hub network;
wherein a source version of the content data is stored on the server, and copies of the source versions are stored on the compliant device as sub-copy versions;
comparing a device count of members in said hub network with a member device limit;
confirming said device count by contacting an external device registration server;
sending a device add request to said device registration server;
receiving a device add permission from said device registration server;
wherein said device add request includes said device count;
wherein the device registration server sends the device add permission to add the client as a member if the client has not been added as a member in any other hub network.

19. The method of claim 18, wherein the client is in the local environment of the server when the client is in a limited area defined relative to the server.

20. A method of reconnecting a client to a hub network which includes a plurality of devices, comprising:
detecting a client newly connected to a hub network by a server,
wherein the server periodically polls the plurality of devices for the client;
authenticating and authorizing the client as a member of the hub network when it is determined that the client is a compliant device that operates according to rules defined for the hub network, and that the client is in a local environment of the server,
wherein the compliant device enables a user to present, move, and copy content data to be controlled to reflect guidelines of licenses of the content data set for a licensing authority,
wherein the client sends a message to the plurality of devices on the hub network indicating that the client is now connected to the hub network; and
providing licenses for the content data bound to the hub network to members of the hub network,
wherein a source version of the content data is stored on the server, and copies of the source versions are stored on the compliant device as sub-copy versions;
comparing a device count of members in said hub network with a member device limit;
confirming said device count by contacting an external device registration server;
sending a device add request to said device registration server;

receiving a device add permission from said device registration server;

wherein said device add request includes said device count;

wherein the device registration server sends the device add permission to add the client as a member if the client has not been added as a member in any other hub network.

21. The method of claim 20, wherein determining that the client is in the local environment of the server comprises sending a local environment confirmation request to the client to determine whether the client is in a limited area defined relative to the server.

22. The method of claim 21, further comprising receiving a reply from the client in response to the local environment confirmation request.

23. The method of claim 22, wherein determining that the client is in the limited area defined relative to the server comprises measuring the time between sending the local environment confirmation request and receiving the reply.

24. The method of claim 20, further comprising refreshing one or more of the licenses for the content data stored on the client.

* * * * *